(12) United States Patent
Muto et al.

(10) Patent No.: US 8,171,217 B2
(45) Date of Patent: *May 1, 2012

(54) STORAGE APPARATUS AND DATA STORAGE METHOD USING THE SAME

(75) Inventors: Junichi Muto, Odawara (JP); Isamu Kurokawa, Odawara (JP); Ran Ogata, Odawara (JP); Kazue Jindo, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/191,079

(22) Filed: Jul. 26, 2011

(65) Prior Publication Data

US 2011/0283064 A1 Nov. 17, 2011

Related U.S. Application Data

(63) Continuation of application No. 12/007,940, filed on Jan. 17, 2008.

(30) Foreign Application Priority Data

Oct. 19, 2007 (JP) ................................. 2007-272900

(51) Int. Cl.
*G06F 12/06* (2006.01)

(52) U.S. Cl. ................. 711/114; 711/112; 711/E12.016
(58) Field of Classification Search .................. 711/114, 711/112
See application file for complete search history.

(56) References Cited

U.S. PATENT DOCUMENTS

| 5,584,008 A | 12/1996 | Shimada et al. |
| 7,058,769 B1 | 6/2006 | Danilak |
| 7,350,101 B1 | 3/2008 | Nguyen et al. |

FOREIGN PATENT DOCUMENTS

| JP | 05-189157 | 1/1992 |
| WO | 9120076 | 12/1991 |

*Primary Examiner* — Kenneth Lo
(74) *Attorney, Agent, or Firm* — Volpe and Koenig, P.C.

(57) ABSTRACT

A storage apparatus comprises a disk device and a disk adapter for controlling the disk device. The disk adapter controls the disk device and forms a data volume and a pool volume, creates a data block for parity data, compresses write data and the created parity data, and stores a number of compressed data blocks equal to or less than a predetermined number and stores compressed parity data that are within a predetermined size in storage areas in an actual volume, and stores the remaining compressed data blocks of a number greater than the predetermined number and compressed parity data that exceed the predetermined size in storage areas in the pool volume corresponding to a virtual volume.

14 Claims, 25 Drawing Sheets

FIG.4

SEGMENT MANAGEMENT TABLE

| Disk ID | Segment # | LBA_start | LBA_end | In_use |
|---------|-----------|-----------|---------|--------|
| 0 | 0 | 0 | 499 | 1 |
| 0 | 1 | 500 | 1799 | 1 |
| 0 | 2 | 1800 | 2999 | 0 |
| 0 | 3 | 1800 | 2999 | 1 |
| ⋮ | ⋮ | ⋮ | ⋮ | ⋮ |
| 1 | 6 | 0 | 699 | 0 |
| 1 | 7 | 700 | 2999 | 1 |
| ⋮ | ⋮ | ⋮ | ⋮ | ⋮ |

FIG.5

ADDRESS MANAGEMENT TABLE

| LUN | Segment # | LBA_start | LBA_end | Pool |
|---|---|---|---|---|
| 0 | 1 | 0 | 1299 | 0 |
| 0 | 6 | 1300 | 1999 | 0 |
| 1 | 2 | 0 | 1199 | 0 |
| 2 | 8 | 0 | 299 | 0 |
| : | : | : | : | : |
| 9 | 8 | 19000 | 19999 | 1 |
| : | : | : | : | : |

FIG.8

DATA BLOCK MANAGEMENT TABLE

| SLOT ID | ADDRESS |
|---|---|
| D1-1 | DEVICE(0): xxxx |
| D2-1 | DEVICE(1): xxxx |
| D3-1 | DEVICE(2): xxxx |
| P1-3 | DEVICE(3): xxxx |
| D1-2 | DEVICE(0): xxxx |
| D2-2 | DEVICE(1): xxxx |
| D3-2 | UNUSED |
| P1-2 | DEVICE(3): xxxx |
| D1-3 | UNUSED |
| D2-3 | UNUSED |
| D3-3 | UNUSED |
| P1-3 | DEVICE(3): xxxx |
| D1-4 | UNUSED |
| D2-4 | UNUSED |
| D3-4 | UNUSED |
| P1-4 | DEVICE(3): xxxx |

FIG.9

DISK DEVICE MANAGEMENT TABLE

| | ADDRESS | USAGE STATUS |
|---|---|---|
| ACTUAL VOLUME | xxxx | D1-1 |
| | ⋮ | ⋮ |
| | ⋮ | ⋮ |
| | ⋮ | ⋮ |
| | ⋮ | ⋮ |
| VIRTUAL VOLUME | EXTENSION 1 | D2-1 |
| | EXTENSION 2 | Free |
| | EXTENSION 3 | Free |
| | ⋮ | ⋮ |
| | EXTENSION n | Null |

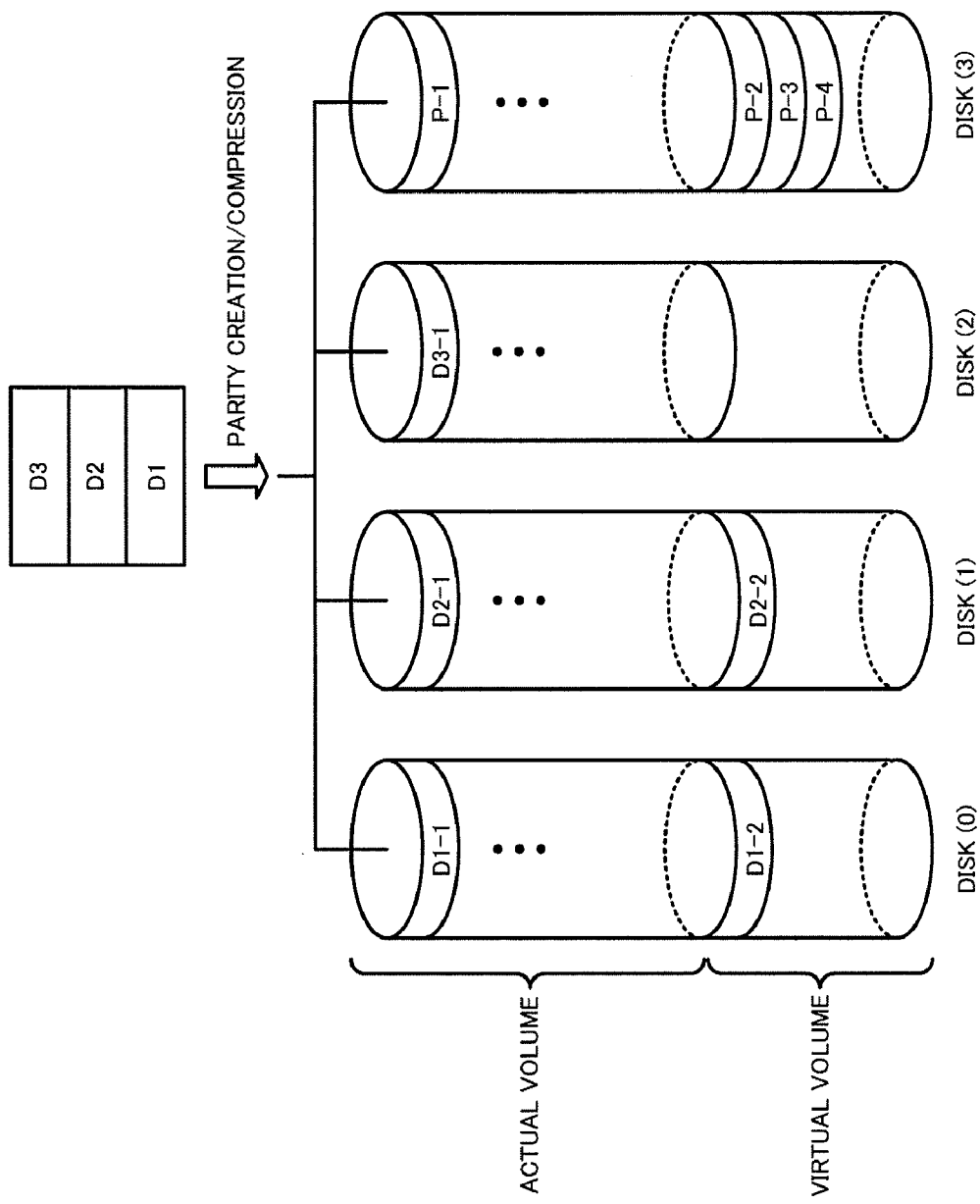

FIG.16

DATA BLOCK MANAGEMENT TABLE

| RAID LEVEL | RAID 1 | |
|---|---|---|
| SLOT ID | ADDRESS 1 | ADDRESS 2 |
| D1-1 | DEVICE(0): xxxx | DEVICE(3): xxxx |
| D2-1 | DEVICE(1): xxxx | DEVICE(0): xxxx |
| D3-1 | DEVICE(2): xxxx | DEVICE(1): xxxx |
| P1-3 | UNUSED | UNUSED |
| D1-2 | UNUSED | UNUSED |
| D2-2 | UNUSED | UNUSED |
| D3-2 | UNUSED | UNUSED |
| P1-2 | UNUSED | UNUSED |
| D1-3 | UNUSED | UNUSED |
| D2-3 | UNUSED | UNUSED |
| D3-3 | UNUSED | UNUSED |
| P1-3 | UNUSED | UNUSED |
| D1-4 | UNUSED | UNUSED |
| D2-4 | UNUSED | UNUSED |
| D3-4 | UNUSED | UNUSED |
| P1-4 | UNUSED | UNUSED |

Parity: [P1-1] [P1-1] [P1-3] [P1-4]

Parity: [P2-1] [P2-1] [P2-3] [P2-4]

FIG.20

DATA BLOCK MANAGEMENT TABLE

| RAID LEVEL | RAID 5 | |
|---|---|---|
| SLOT ID | ADDRESS | ADDRESS 2 |
| D1-1 | DEVICE(0): xxxx | UNUSED |
| D2-1 | DEVICE(1): xxxx | UNUSED |
| D3-1 | DEVICE(2): xxxx | UNUSED |
| P1-3 | DEVICE(3): xxxx | UNUSED |
| D1-2 | DEVICE(0): xxxx | UNUSED |
| D2-2 | DEVICE(1): xxxx | UNUSED |
| D3-2 | UNUSED | UNUSED |
| P1-2 | DEVICE(3): xxxx | UNUSED |
| D1-3 | UNUSED | UNUSED |
| D2-3 | UNUSED | UNUSED |
| D3-3 | UNUSED | UNUSED |
| P1-3 | DEVICE(3): xxxx | UNUSED |
| D1-4 | UNUSED | UNUSED |
| D2-4 | UNUSED | UNUSED |
| D3-4 | UNUSED | UNUSED |
| P1-4 | DEVICE(3): xxxx | UNUSED |

FIG.24A

DATA BLOCK MANAGEMENT TABLE

| RAID LEVEL | RAID 5 | |
|---|---|---|
| LEARNED INFORMATION | RAID 5 | |
| SLOT ID | ADDRESS | ADDRESS 2 |
| D1-1 | DEVICE(0): xxxx | UNUSED |
| D2-1 | DEVICE(1): xxxx | UNUSED |
| D3-1 | DEVICE(2): xxxx | UNUSED |
| P1-1 | DEVICE(3): xxxx | UNUSED |
| D1-2 | DEVICE(0): xxxx | UNUSED |
| D2-2 | DEVICE(1): xxxx | UNUSED |
| D3-2 | UNUSED | UNUSED |
| P1-2 | DEVICE(3): xxxx | UNUSED |
| D1-3 | UNUSED | UNUSED |
| D2-3 | UNUSED | UNUSED |
| D3-3 | UNUSED | UNUSED |
| P1-3 | DEVICE(3): xxxx | UNUSED |
| D1-4 | UNUSED | UNUSED |
| D2-4 | UNUSED | UNUSED |
| D3-4 | UNUSED | UNUSED |
| P1-4 | DEVICE(3): xxxx | UNUSED |

FIG.24B

DATA BLOCK MANAGEMENT TABLE

| RAID LEVEL | RAID 1 | |
|---|---|---|
| LEARNED INFORMATION | — | |
| SLOT ID | ADDRESS 1 | ADDRESS 2 |
| D1-1 | DEVICE(0): xxxx | DEVICE(3): xxxx |
| D2-1 | DEVICE(1): xxxx | DEVICE(0): xxxx |
| D3-1 | DEVICE(2): xxxx | DEVICE(1): xxxx |
| P1-1 | UNUSED | UNUSED |
| D1-2 | UNUSED | UNUSED |
| D2-2 | UNUSED | UNUSED |
| D3-2 | UNUSED | UNUSED |
| P1-2 | UNUSED | UNUSED |
| D1-3 | UNUSED | UNUSED |
| D2-3 | UNUSED | UNUSED |
| D3-3 | UNUSED | UNUSED |
| P1-3 | UNUSED | UNUSED |
| D1-4 | UNUSED | UNUSED |
| D2-4 | UNUSED | UNUSED |
| D3-4 | UNUSED | UNUSED |
| P1-4 | UNUSED | UNUSED |

STORAGE APPARATUS AND DATA STORAGE METHOD USING THE SAME

CROSS-REFERENCES TO RELATED APPLICATIONS

This application is a continuation of U.S. patent application Ser. No. 12/007,940 filed on Jan. 17, 2008, which is incorporated by reference. This application relates to and claims priority from Japanese Patent Application No. 2007-272900, filed on Oct. 19, 2007, the entire disclosure of which is incorporated herein by reference.

BACKGROUND

1. Field of the Invention

The invention relates generally to a storage apparatus and a data storage method using the same, and more particularly to a storage technique for compressing and efficiently storing write data under RAID control.

2. Description of Related Art

A technique is known in which data is compressed and stored for effectively utilizing limited storage resources in a storage apparatus. In the arrangement in which data is compressed and then stored, the size of compressed data is not fixed and greatly depends on the content of data before the compression.

Reference 1 (JP 5-189157 A) discloses a storage apparatus that stores, when data is compressed and stored in a disk drive, a portion of the compressed data that cannot be stored in a predetermined storage area in an overflow storage area. Specifically, in reference 1, when data from a main processing apparatus is written in a disk drive, this data is compressed by a compression unit, where judgment is made as to whether or not the compressed data can be stored in a relevant block in a fixed size storage area in the disk drive based on the address. If it is determined that the compressed data cannot be stored in the relevant block, a portion of this compressed data is stored in the relevant block and the remaining portion is stored in the overflow storage area.

Recently, storage apparatuses using RAID (Redundant Arrays of Independent Disks) technology have been becoming mainstream due to their large capacity and high reliability. In RAID, a RAID level (i.e., RAID 0 to RAID 6) is defined in accordance with the configuration of a hard disk drive. For example, the RAID 1 level involves a manner (mirroring) in which plural pieces of data having the same content are simultaneously written to plural hard disk drives, and the RAID 5 level involves a manner in which a block unit of data is distributed and written to plural hard disks with error correcting code data (parity data).

Of such RAID configurations, RAID 5 is popular because its general performance is great in practical use. As described above, parity data is used in RAID 5 in light of fault tolerance, so when write data is compressed and stored, the parity data is also compressed and stored. In general, the randomness of data bits of parity data is typically higher than that of write data, and high compression efficiency cannot be expected. For this reason, it is highly probable that data overflow resulting from low compression efficiency will constantly occur, and that the conventionally prepared overflow storage area might be used up quickly. Also, if an overflow storage area with a sufficient size is prepared from the start, the running costs increase, which is not economic.

SUMMARY

It is an object of the present invention to provide a storage apparatus capable of efficiently storing compressed data based on write data under a predetermined RAID configuration.

Specifically, the present invention proposes a storage apparatus that stores, if the entire compressed data cannot be stored in a predetermined storage area, the portion that cannot be stored (i.e., an overflow portion) in the compressed data in a storage area (extensible storage area) that can be flexibly extended depending on actual usage.

In addition, the present invention proposes a storage apparatus that stores, when the efficient storage of compressed data cannot be expected under a certain RAID configuration, this compressed data in another RAID configuration with which efficient storage can be expected, In other words, the present invention proposes a storage apparatus that selects the RAID configuration most suitable for storing compressed data in accordance with the compression efficiency for parity data.

In order to achieve the above object, the storage apparatus in the present invention has the below technical feature.

Specifically, provided according to a first aspect of the present invention is a storage apparatus comprising a disk device having a storage medium for storing data and a disk controller configured to control the disk device. The disk controller includes a channel adapter configured to connect a host computer, a disk adapter that is connected to the disk device, and a cache memory that temporarily stores data exchanged between the channel adapter and the disk adapter. The disk adapter controls the disk device to form a data volume and a pool volume. The data volume includes an actual volume that is defined with a storage capacity larger than an inherent storage capacity for the storage medium and is associated with a storage area in the storage medium, and a virtual volume that is assigned a storage area other than the actual volume. The pool volume is assigned with a storage area for storing data to be stored in the storage area assigned to the virtual volume.

The disk adapter creates, based on write data according to a write command transmitted from the host computer, parity data in a parity group to which the write data belongs under control based on a predetermined RAID configuration, compresses the write data and the created parity data in the parity group to create compressed data and compressed parity data, judges whether the size of the compressed data and the size of the compressed parity data in the parity group are each within a predetermined size, stores portions of the compressed data and compressed parity data that are within the predetermined size respectively in storage areas in the actual volume, and stores portions of the compressed data and compressed parity data that exceed the predetermined size respectively in storage areas in the pool volume corresponding to the virtual volume.

The present invention can also be regarded as a method invention. Specifically, provided according to a second aspect of the present invention is a data storage method in a storage apparatus that includes a disk device having a storage medium for storing data and a disk controller that controls the disk device.

This data storage method includes: a step of controlling the disk device to form a data volume and a pool volume, the data volume including an actual volume that is defined with a storage capacity larger than an inherent storage capacity for the storage medium and is associated with a storage area in the storage medium, and a virtual volume that is assigned a storage area other than the actual volume, the pool volume being assigned a storage area for storing data to be stored in the storage area assigned to the virtual volume; a step of creating, based on write data relating to a write command transmitted from the host computer, parity data in a parity group to which the write data belongs based on a predetermined RAID configuration; a step of compressing the write data and the created parity data in the parity group to create compressed data and compressed parity data; a step of judging whether the size of the compressed data and the size of the compressed parity data in the parity group are each within a predetermined size; and a step of storing portions of the compressed data and compressed parity data that are within the predetermined size respectively in storage areas in the actual volume, and portions of the compressed data and compressed parity data that exceed the predetermined size respectively in storage areas in the pool volume corresponding to the virtual volume.

According to the present invention, compressed data based on write data can be efficiently stored under a predetermined RAID configuration.

In addition, according to the present invention, when the entire compressed data cannot be stored in a predetermined storage area, the non-storable portion of this compressed data is stored in an extended storage area. Accordingly, flexible disk device configuration suitable for the actual usage of the storage area can be used.

Furthermore, according to the present invention, since a suitable RAID configuration depending on the compression efficiency of data including parity is selected, efficient storage of compressed data can be realized.

Other aspects and advantages of the invention will be apparent from the following description and the appended claims.

BRIEF DESCRIPTION OF THE DRAWINGS

FIG. 4 is a diagram showing an example of a segment management table in the storage apparatus according to an embodiment of present invention.

FIG. 5 is a diagram showing an example of an address management table stored in the shared memory in the storage apparatus according to an embodiment of the present invention.

FIG. 8 is a diagram showing an example of a data block management table stored in the shared memory in the storage apparatus according to an embodiment of the present invention.

FIG. 9 is a diagram showing an example of a disk device management table stored in the shared memory in the storage apparatus according to an embodiment of the present invention.

FIG. 11 is a diagram explaining the data write mechanism in the storage apparatus according to an embodiment of the present invention.

FIG. 16 is a diagram showing an example of a disk device management table stored in the shared memory in the storage apparatus according to an embodiment of the present invention.

FIGS. 18A and 18B are diagrams each explaining a data write mechanism in a storage apparatus according to an embodiment of the present invention.

FIG. 20 is a diagram showing an example of a disk device management table stored in a shared memory in the storage apparatus according to an embodiment of the present invention.

FIGS. 24A and 24B are diagrams each showing an example of a disk device management table stored in a shared memory in a storage apparatus according to an embodiment of the present invention.

DETAILED DESCRIPTION OF PREFERRED EMBODIMENTS

Some embodiments of the present invention will be described with reference to the attached drawings.

First Embodiment

The first embodiment will describe a storage apparatus that is configured to, under the RAID 5 configuration, compress write data and store the compressed data in an actual storage area in a data volume, where when the entire compressed data cannot be stored in this actual storage area, the non-storable portion is stored in an extended storage area provided by a volume capacity virtualization function.

Figure 1:
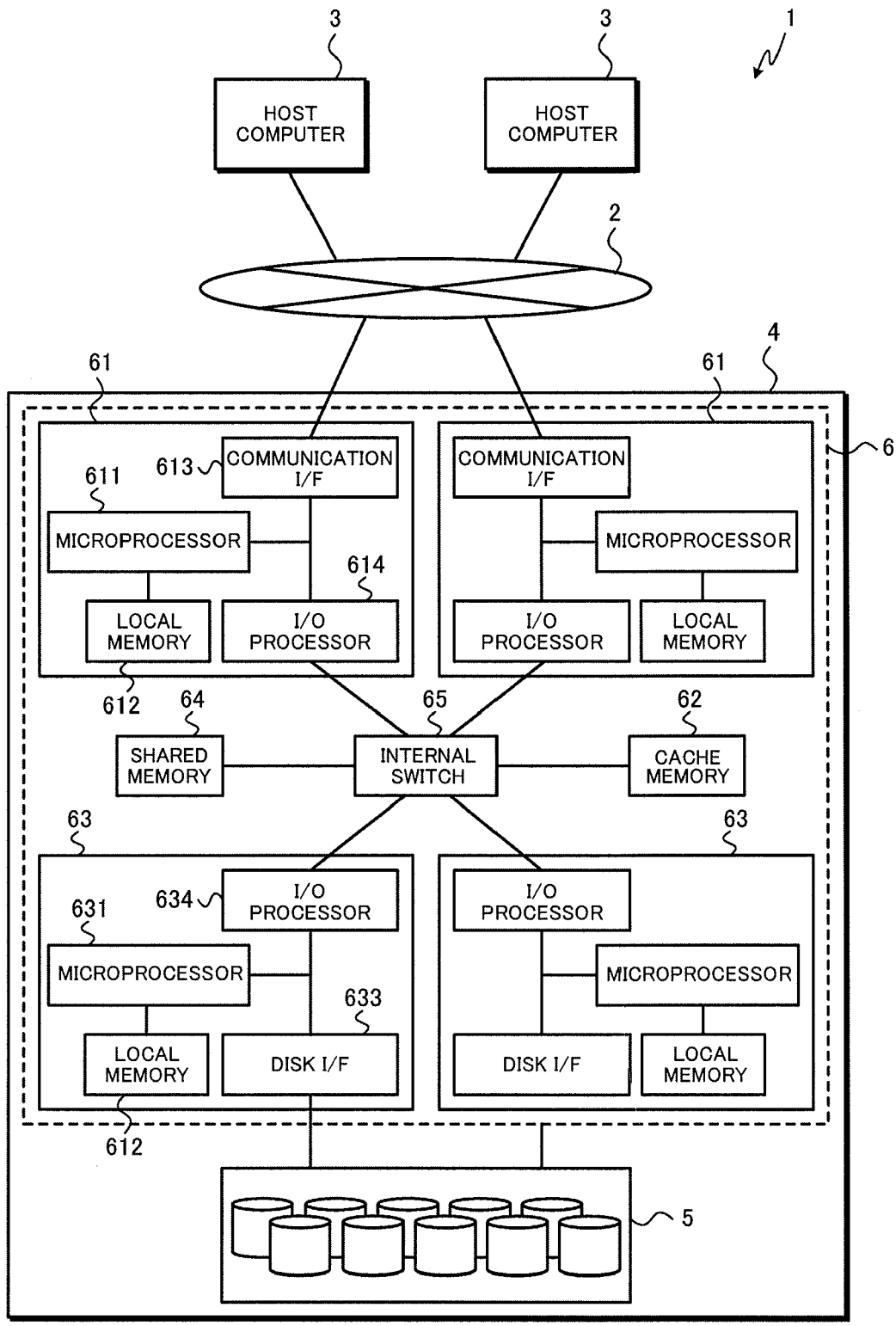
FIG. 1 is a block diagram illustrating a configuration of a storage system according to an embodiment of the present invention.

FIG. 1 is a block diagram explaining a configuration of a storage system according to the first embodiment of the present invention. As shown in FIG. 1, a computer system 1 includes a storage apparatus 4 that is connected to a host computer 3 via a network 2.

The network 2 may be a LAN, the Internet, a SAN (Storage Area Network) or similar, which includes a network switch, a hub, etc. In this embodiment, the network 2 is a SAN using fibre channel protocol (FC-SAN).

The host computer 3 is a core computer in an operation system for banks, or seat reservation system for an airline, etc. The host computer 3 includes: hardware resources such as a processor, a main memory, a communication interface, and a local input/output device; and software resources such as a device driver, an operating system (OS) and an application program (each not shown). With that configuration, the host computer 3 executes various programs under the control of the processor in cooperation with the hardware resources in order to realize desired processing. For example, the host computer 3 executes a business application program under the control of the processor, accesses the storage apparatus 4 (to be described below in detail) and realizes a desired operation system.

The storage apparatus 4 is an auxiliary storage apparatus that provides a data storage service to the host computer 3. The storage apparatus 4 includes a disk device 5 for storing data and a disk controller 6 for managing the configuration of the disk device 5 and for controlling I/O processing such as write and read processing to the disk device 5. The storage apparatus 4 may also include a management apparatus or a service processor (both not shown) for managing the entire storage apparatus 4. Alternatively, the disk controller 6 may be configured so as to include the function of a management apparatus. The management apparatus may be a general-purpose computer installed with a management program.

As will be described later, the storage apparatus 4 in this embodiment compresses write data and stores the compressed data in a predetermined storage area in the disk device 5 under RAID control. When the compressed data has a size exceeding a predetermined block size, the storage apparatus 4 stores the excess portion of the compressed data in an extended storage area (pool volume). The pool volume is a logical volume that stores actual data and is associated with a virtual volume provided by the volume capacity virtualization function.

The disk device 5 is a physical device (PDEV) that includes a storage medium such as hard disk drives (HDDs) or semi-conductor memory devices. A group of plural hard disks are sometimes referred to as a disk array. In the disk device 5, one or more logical devices (LDEV) are formed under the control of the disk controller 6, and these logical devices are provided to the host computer 3. The logical device may be formed on a virtual device VDEV that is a group of some hard disk drives virtually integrated to one device.

The logical devices are logical storage apparatuses that can be recognized by the host computer 3. The logical devices may each be assigned a logical unit (LU). In such an arrangement, the logical devices are assigned respectively to ports provided to each channel adapter 61 (to be described later), through which the host computer 3 recognizes those logical devices as logical units. Each logical unit is assigned a logical unit number (LUN). The logical unit is divided into blocks that are the minimum units of I/O accesses, and each block is assigned a logical block address (LBA). By providing the storage apparatus 4 with a logical address containing a LUN and a LBA, the host computer 3 can access data stored in an arbitrary block in a certain logical unit. The logical device and the logical unit may be distinguished from each other in the system environment in which the storage apparatus 4 is applied, but they can be treated as having the same meaning in the present invention.

A logical volume (LVOL or VOL) is defined in the logical device depending on its attribute, but they are sometimes treated as having the same meaning. In this embodiment, a data volume and a pool volume are defined as a logical volume. As will be described later, the data volume includes an actual volume and a virtual volume.

The disk controller 6 includes channel adapters (CHA) 61, a cache memory (CM) 62, disk adapters (DKA) 63, and a shared memory (SM) 64, and these components are connected to each other via an internal switch (SW) 65. The components are preferably multiplexed in view of high-speed performance and fault tolerance.

The disk controller 6 is a main system board in the storage apparatus 4, the disk controller 6 controlling disk device 5 to realize a data storage service. The disk controller 6 in this embodiment has configurations for realizing a data compression/extension function, a RAID function and a volume capacity virtualization function in addition to a conventional I/O processing function based on an I/O access request from the host computer 3.

The channel adapter 61 is a component for connecting the storage apparatus 4 to the host computers 3 via the network so as to enable communication between them. In this embodiment, two channel adapters 61 are installed. The channel adapters 61 each include a microprocessor 611, a local memory 612, a communication interface (I/F) 613, and an I/O processor 614.

The microprocessor 611 is a chip circuit that integrally controls the operation of the channel adapter 61 by executing a microprogram stored in the local memory 612. The communication I/F 613 receives and transmits communication packets or frames from and to the network 2. The communication I/F 613 includes a plurality of ports (not shown) for connecting the channel adapter 61 to the network 2. The I/O processor 614 controls data exchange between other components (e.g., the cache memory 62 and the shared memory 64) that are connected via the internal switch 65 in the disk controller 6.

Specifically, when receiving a packet via the communication I/F 613, the microprocessor 611 performs protocol conversion processing according to a predetermined protocol to extract internal data. Then, the microprocessor 611 interprets the internal data and controls, if the internal data is a write command, the I/O processor 614 to write the write command to the shared memory 64 and write the relevant write data (i.e., user data) in the cache memory 62. The I/O processor 614 consequently writes the write command in the shared memory 64 and writes the write data in the cache memory 62.

The microprocessor 611 reads read data from the cache memory 62 via the I/O processor 614 based on a read command, creates packets by performing protocol conversion processing according to a predetermined protocol, and transmits the packets to the network 2 via the communication I/F 613.

The cache memory 62 temporarily stores (caches) user data transferred between the host computers 3 and the disk device 5 (logical volumes) in order to provide high system performance for the host computers. In other words, the cache memory 62 is a memory used for data transfer between the channel adapters 61 and the disk adapters 63. The cache memory 62 may be a volatile memory such as a DRAM. Alternatively, the cache memory 62 may be a non-volatile memory such as a flash memory.

As will be described later, the cache memory 62 is also used as a memory for temporarily storing write data that has been compressed (compressed data). Data compression/extension processing is performed by, for example, the disk adapters 63.

Figure 2:
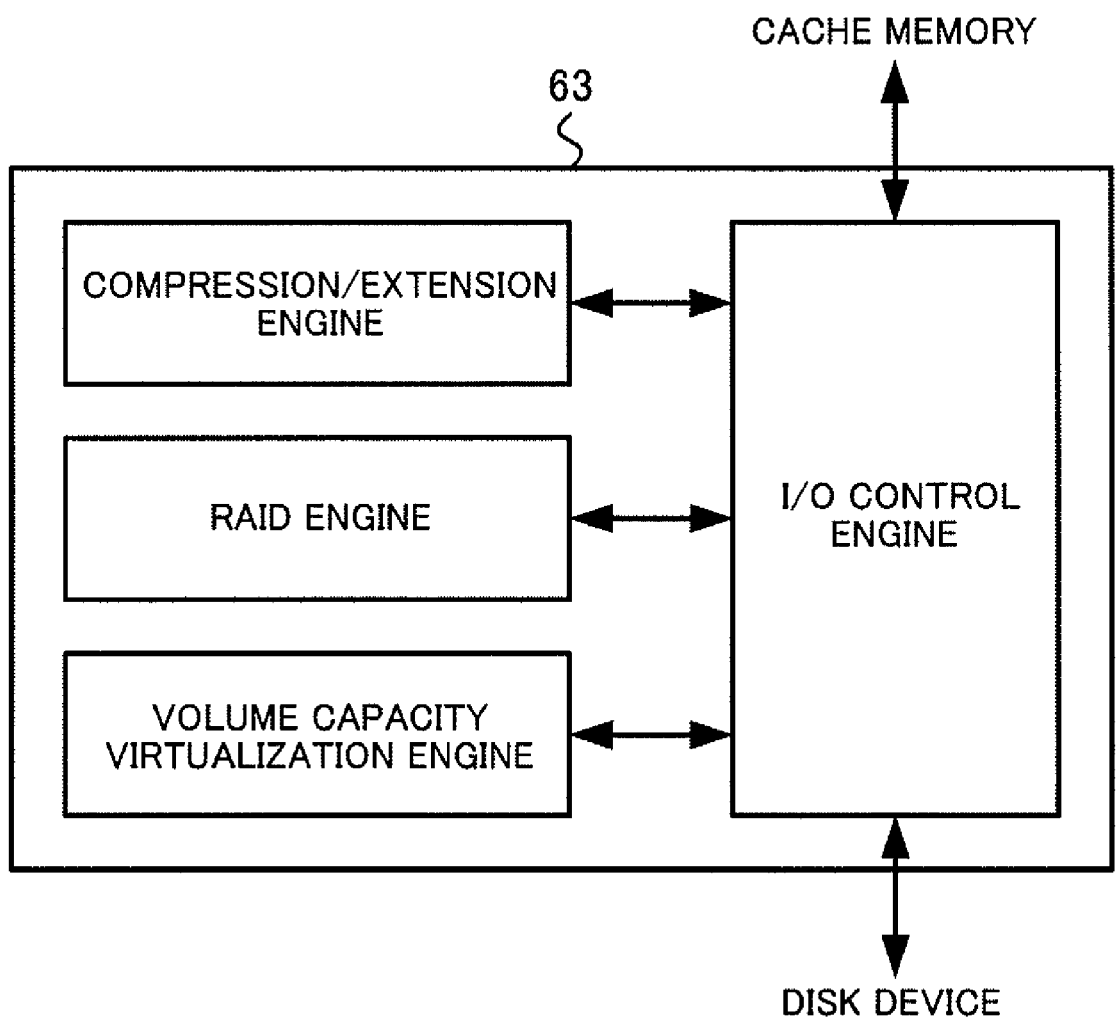
FIG. 2 is a block diagram functionally explaining a disk adapter in a disk controller in a storage apparatus according to an embodiment of the present invention.

The disk adapters are components that perform I/O access in relation to the disk device 5 connected via the disk channels. In this embodiment, two disk adapters 63 are installed. The disk adapters 63 each include a microprocessor 631, a local memory 632, a disk interface (I/F) 633, and an I/O processor 634. In this embodiment, the disk adapter 63 has an I/O control function, a data compression/extension function, a RAID function, and a volume capacity virtualization function. For example, these functions are embodied as firmware shown in FIG. 2.

The microprocessor 631 is a chip circuit that integrally controls the operation of the disk adapter 63 by executing a microprogram stored in the local memory 632. In this embodiment, the microprocessor 631 creates, under RAID control, compression data by performing compression processing on write data stored in the cache memory 62 based on a predetermined compression algorithm, and writes this compression data in a certain storage area in the disk device 5. The certain storage area here is a storage area in an actual volume (actual storage area). A compressed data portion that cannot be stored in this actual storage area is stored in an extended storage area (pool volume) that is managed by the volume capacity virtualization function. The compression/extension algorithm may employ a known algorithm such as a LZW algorithm.

The disk I/F 633 is an interface that makes I/O access to a disk device 5 (physical device). The I/O processor 634 controls data transfer between other components (e.g., the cache memory 62 and the shared memory 64) that are connected via the internal switch 65.

Specifically, the microprocessor 631 periodically (e.g., every several tens of seconds) or non-periodically refers to the shared memory 64 via the I/O processor 634. When finding an unprocessed write command in the shared memory 64, the microprocessor 631 takes the corresponding write data from the cache memory 62 and performs compression under RAID control to create the compressed data. In other words, parity data based on the write data is created and compressed data for the write data including this parity data is created. The compressed data is re-stored in a compressed data block in the cache memory 62. The microprocessor 631 then stores (de-stages) the created compressed data in a certain storage area (block) in the disk device 5 that forms a data volume under RAID control. For example, when the RAID 5 (3D+1P) configuration is employed, the compression data with the parity data is divided and stored in disk devices 5 of physical different systems. At this time, the microprocessor 63 judges whether or not the entire created compressed data can be stored in the actual storage area defined in the data volume, and if it is determined that the entire compressed data cannot be stored, the microprocessor 63 stores the non-storable portion of this compressed data in the extended storage area managed by the volume capacity virtualization function.

The microprocessor 631 reads, under RAID control, the compressed data from the certain logical volume based on the relevant read command in the shared memory 64 and temporarily stores the compressed data in the cache memory 62. Then, the microprocessor 631 performs extension processing and again writes (stages) the resulting extended data (original data) in the cache memory 62. If a portion of the compressed data is stored in the extended storage area, the microprocessor 631 reads this portion from the extended storage area and integrates it into the compressed data.

The shared memory 64 stores a variety of information that each component in the storage apparatus 4 refers to. The shared memory 64 may be a volatile memory such as a DRAM.

The internal switch 65 is a switching device which may be a cross bar switch or similar. The internal switch 65 arbitrates conflict between input data signals, switches paths for the data signals and constructs a path between a source module and a destination module. The internal switch 65 may be a switching device of a packet exchange system.

Figure 3:
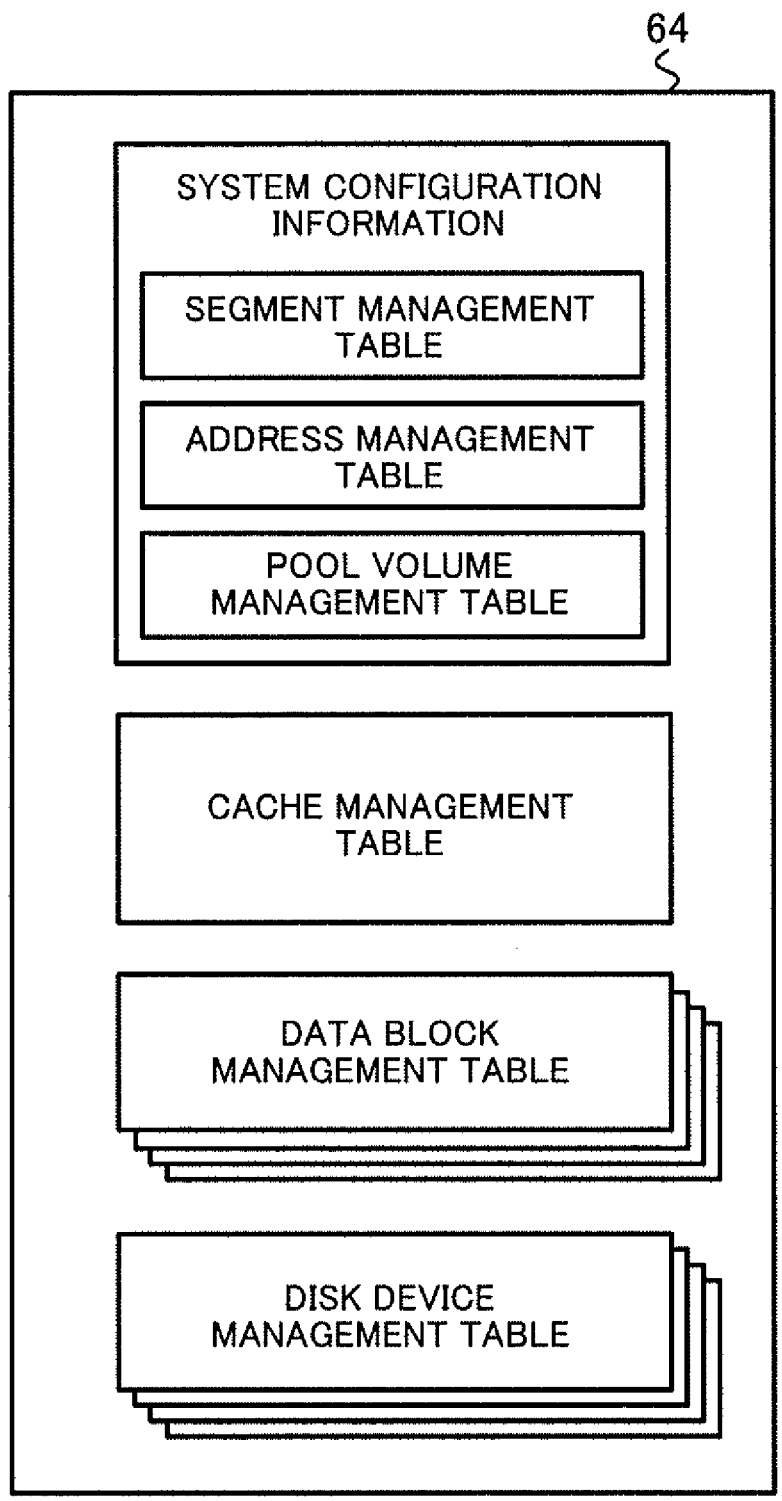
FIG. 3 is a diagram showing the content of a shared memory in the storage apparatus according to an embodiment of the present invention.

FIG. 3 shows the content of the shared memory 64 in the storage apparatus 4 according to the first embodiment of the present invention. For example, as shown in FIG. 3, the shared memory 64 stores a variety of information such as system configuration information, a cache management table, a data block management table, and a physical device management table.

The system configuration information is information about the configuration of a system such as the configuration information for the disk device 5 and version information for a microprogram running on each component in the storage apparatus 4. For example, the configuration information of the disk device 5 may contain RAID configuration information, physical device/logical device (volume) configuration information and volume capacity virtualization configuration information. For example, the physical device/logical device configuration information is defined as a segment management table and an address management table. The volume capacity virtualization configuration information contains, for example, a pool volume management table.

The system configuration information is set and managed by a management apparatus operated by a system administrator. The system administrator can set the configuration of RAID 5 (3D+1P) by operating the management apparatus. The system administrator operates the management unit to set the volume capacity virtualization configuration information when a hard disk drive is added.

The cache management table manages directory information for data cached in the cache memory 62. The cache management table manages the correlation between data blocks in write data and blocks in the disk device (logical volumes) 5.

As described above, not write data itself but compressed data for the write data is stored in the logical volume (data volume) in this embodiment. Thus, the size of blocks in the storage area defined in the data volume is typically defined to be smaller than the size of blocks defined in the cache memory 62 in consideration of the average compression ratio. The disk adapter 63 re-stores the compressed data read from a certain block in the cache memory 62 in another block 62 (compressed data block) in the cache memory before performing destaging. In view of this, the cache management table associates logical addresses of raw write data and compressed data in the cache memory 62 with logical addresses in the data volume.

The data block management table manages data blocks for each parity group by RAID control. The parity group in this specification is a data block group of data pieces that are written in an array disk simultaneously and in parallel. For example, in RAID 5 configuration (3D+1P), a data block group consisting of three data blocks and one parity block belongs to a common parity group.

The disk device management table manages the usage of an address space in "disk devices" that define a data volume and have a stripe configuration (i.e., disk devices of physically-different systems) under RAID control. The number of disk device management tables provided is the same as the number of striped disk devices. For example, in RAID 5 (3D+1P) configuration, four disk device management tables are provided. According to a practical explanation about RAID, disk devices having the stripe configuration can be regarded as being equal to an individual physical device. However, in this embodiment, the "disk devices" having the stripe configuration will be explained by a concept containing a virtual volume that does not have a physical storage area due to the volume capacity virtualization function. Accordingly, in this specification, disk devices that define the stripe configuration under RAID control will be each referred to as a "pseudo disk device." In RAID 5 (3D+1P) configuration, a certain data volume is formed in four pseudo disk devices.

FIG. 4 shows an example of a segment management table in the storage apparatus 4 according to the first embodiment of the present invention. The segment management table is a table for managing storage area spaces in the logical volume provided by the storage apparatus 4. As shown in FIG. 4, the segment management table includes disk IDs, segment numbers, LBA start addresses, LBA end addresses and segment usage.

The disk IDs are identifiers for uniquely identifying the physical devices included in the disk device 5. The segment numbers are numbers for uniquely identifying segments. The segments are storage areas in the disk device 5 managed by the disk controller 6. The LBA start address and the LBA end address are addresses respectively indicating the physical start position and end position of a certain segment in the disk device 5. The LBA start address and the LBA end address define the size of the relevant segment. The segment usage indicates whether or not the relevant segment is in use. The value "1" is set when the segment is in use, while the value "0" is set when the segment is not in use.

FIG. 5 shows an example of an address management table stored in the shared memory 64 in the storage apparatus 4 according to the first embodiment of the present invention. The address management table is a table that correlates the storage areas in the logical volume provided by the storage apparatus 4 (i.e., logical address spaces) and actual storage areas in the disk device 5 (i.e., physical storage spaces) with each other. The disk adapter 63 refers to the address management table in order to convert a logical address specified as a data storage destination to a physical address in the disk device 5, and makes access based on this physical address. The address management table defines a segment that is used as a pool volume from among the logical volumes.

As shown in FIG. 5, the address management table includes logical unit numbers (LUN), segment numbers, LBA start addresses, LBA end addresses and pool assignment statuses. The logical unit numbers are numbers for uniquely identifying the logical volumes provided by the storage apparatus 4 for the host computer 3. The segment numbers are numbers for uniquely identifying storage areas managed by the segment management tables. A logical volume LU is defined by a plurality of segments. The LBA start address and the LBA end address indicate respectively the logical start address and the logical end address of a certain segment. The pool assignment status indicates whether or not the relevant segment is used as a pool volume. When the relevant segment is used as a pool volume, the value "1" is set.

Figure 6:
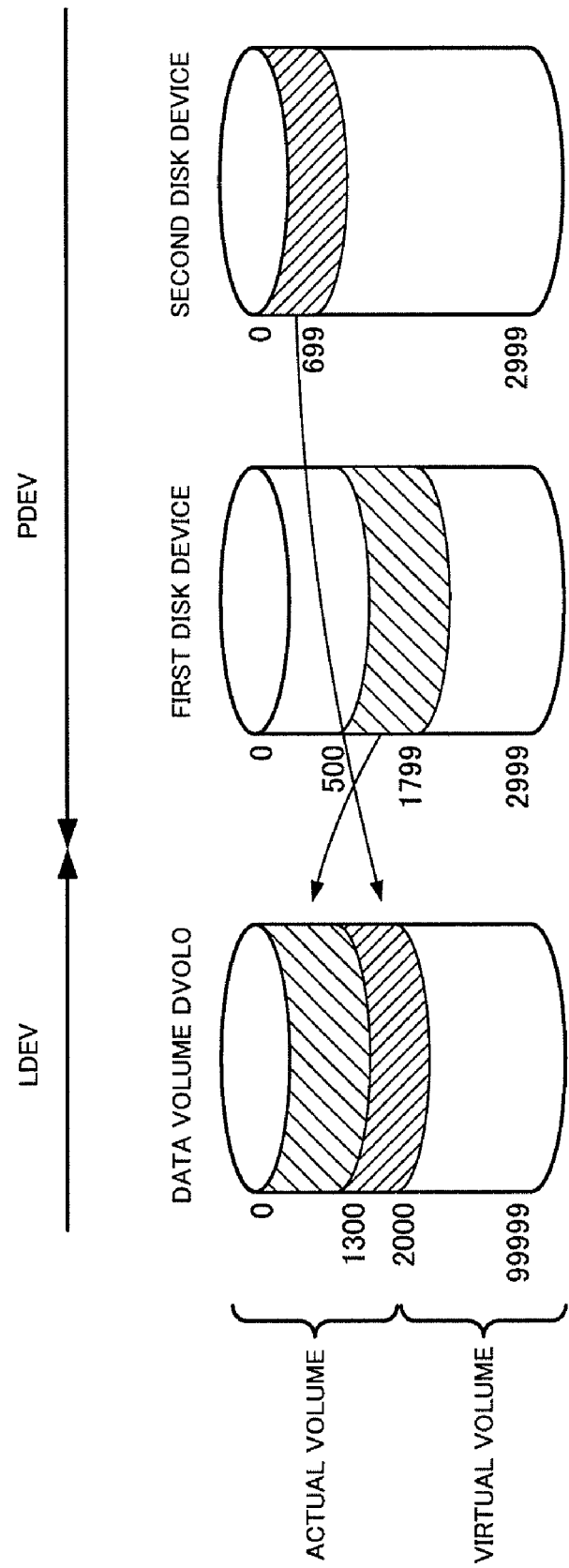
FIG. 6 is a diagram explaining a data volume stored in the shared memory in the storage apparatus according to an embodiment of the present invention.

FIG. 6 is a diagram explaining a data volume stored in the shared memory 64 in the storage apparatus according to the first embodiment of the present invention. As shown in FIG. 6, a data volume DVOL0 has logical address spaces 0 to 99999 to which segments in a first disk device and a second disk device are assigned. As shown in FIG. 4, the first disk device 5 is a physical device that is assigned the disk ID "0," while the second disk device 5 is a physical device that is assigned the disk ID "1." As shown in FIG. 5, the segment having the segment number "1" provides logical address spaces 0 to 1299 in the data volume DVOL0. The segment having the segment number "3" provides the logical address spaces 1300 to 1999. In this way, the data volume DVOL0 is handled as if it were one disk device.

The logical address spaces 2000 to 99999 in the data volume DVOL0 are not assigned disk devices (physical devices). The disk controller 6 also ostensibly stores data in these spaces in the data volume DVOL. For this purpose, the storage apparatus 4 further includes a logical volume that is referred to as a pool volume PVOL and stores data that should be stored in a storage area, for which no segment in the disk device 5 is assigned (i.e., extended storage area), in this pool volume PVOL. In short, the actual data that is stored in the logical address spaces 2000 to 49999 in the data volume DVOL0 is stored in the pool volume PVOL. Accordingly, the access made to the extended storage area in the data volume is internally made to the pool volume PVOL based on the pool volume management table. The data that should be stored in the extended storage area is the compressed data blocks that cannot be stored in the storage areas that are actually provided by the physical devices (actual storage areas).

FIG. 6 explains, in a simplified manner, a data volume DVOL in which a volume capacity virtualization function is utilized. In this embodiment, the disk device 5 is arranged as a stripe configuration in accordance with the RAID configuration. With this arrangement, the data volume DVOL is actually provided by pseudo disk devices of physically different systems.

Figure 7:
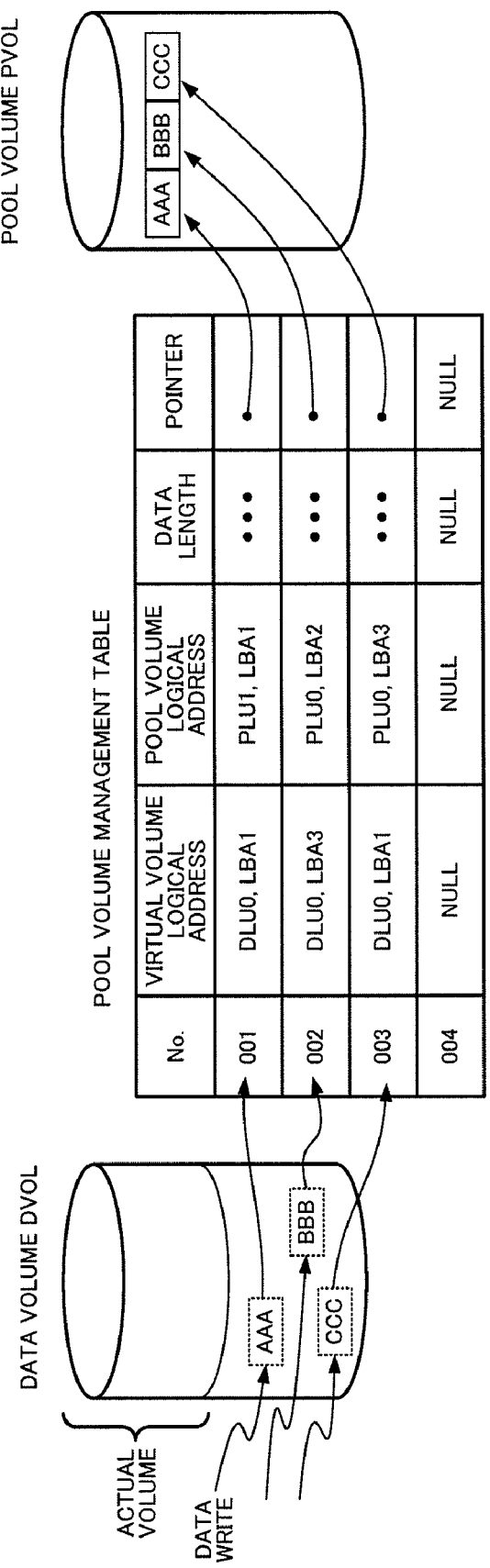
FIG. 7 is a diagram conceptually explaining the dynamic assignment of storage areas in the storage apparatus according to an embodiment of the present invention.

FIG. 7 is a diagram conceptually explaining the dynamic assignment of storage areas in the storage apparatus 4 according to the first embodiment of the present invention.

As described above, the data volume DVOL and the pool volume PVOL are formed in the disk device 5 in the storage apparatus 4 according to this embodiment. The data volume DVOL is a logical volume provided to the host computer 3. The data volume DVOL is divided into an actual volume and a virtual volume depending on the unique storage capacities of the physical devices constituting the actually installed disk device 5. In other words, the actual volume includes physical storage areas defined by segments that are actually provided by the physical device in the disk device 5. On the other hand, the virtual volume corresponds to virtual storage areas (extended storage areas) other than the actually provided segments. Accordingly, the actual data is not stored in the virtual volume. The pool volume PVOL is a logical volume that provides a storage area for temporarily storing the actual data, which should be stored in the virtual volume, until a future additional disk device is installed, a physical storage area is secured and a new data volume DVOL is defined.

Regarding the storage areas in the actual volume in the data volume DVOL, the storage apparatus 4 associates, one by one, logical addresses (LUN and LBA) recognized by the host computer 3 and physical addresses in the storage areas in the disk device 5. With this arrangement, the host computer 3 can access a desired storage area in the disk device by specifying a certain logical address.

In contrast, regarding the storage area in the pool volume, the storage apparatus 4 does not directly associate the logical addresses recognized by the host computer 3 and the physical addresses, which are used for actually accessing data, in the disk device 5 with each other. Based on a data write command that specifies a storage area in the virtual volume in the data volume DVOL, the disk adapter 63 dynamically assigns this storage area in the pool volume PVOL. Likewise, based on a read command from a storage area in the virtual volume in the data volume DVOL, the disk adapter 63 reads data from this storage area in the pool volume.

As described above, the storage apparatus 4 stores the pool volume management table and manages the dynamic assignment between the virtual volume and the pool volume. The pool volume management table is, for example, stored in the shared memory 64 in the disk controller 6. When all of the compressed data cannot be stored in the actual volume, the storage apparatus 4 stores the non-storable portion in the pool volume PVOL and registers the relevant logical address in the virtual volume and a pointer indicating the relevant address in the pool volume by associating them with each other.

FIG. 8 is a diagram showing an example of a data block management table stored in the shared memory 64 in the storage apparatus 4 according to the first embodiment of the present invention. As shown in FIG. 8, in the data block management table, a slot ID and an address in the data volume are associated with each other. The slot ID is an identifier for identifying a data block in a parity group. The data block management table manages which data block in the parity group is stored in which address in the physical device using this slot ID.

FIG. 9 is a diagram showing an example of a disk device management table stored in the shared memory 64 in the storage apparatus 4 according to the first embodiment of the present invention. As shown in FIG. 9, the disk device management table associates a storage area indicated by a unique address in each pseudo disk device and a data block (slot identifier) stored in that storage area with each other. The disk device management table also manages the usage status of extended storage areas. This example shows a disk device management table corresponding to a pseudo disk device (0). Specifically, the disk device management table in FIG. 9 shows that the storage area indicated by the address "xxxx" stores "D1-1" and the extended storage area 1 stores "D1-2." The disk device management table in FIG. 9 also shows that the extended storage area 2 can be used and the extended storage area n has not been assigned an actual storage area yet.

Figure 10A:
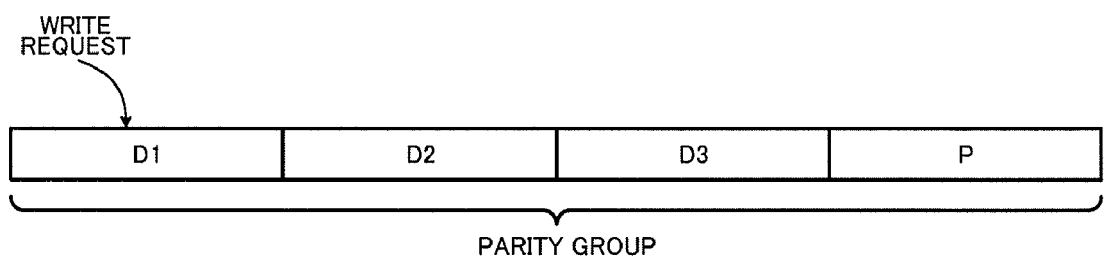
FIGS. 10A and 10B are diagrams each explaining a data write mechanism in the storage apparatus according to an embodiment of the present invention.
Figure 10B:
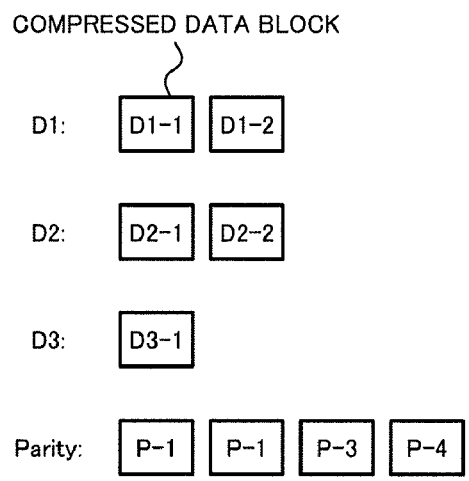

FIGS. 10A and 10B, and FIG. 11 are diagrams explaining a data write mechanism in the storage apparatus 4 according to the first embodiment of the present invention. Specifically, these figures show how write data is compressed and then stored in pseudo disk devices of different systems in RAID 5 (3D+1P) configuration.

The write data to be written to data volumes is handled as block-data (data block) in the storage apparatus 4. An example of the size of a block unit is 64 KB. In this embodiment, since write data is compressed before being stored, a unit storage area having the size smaller than the size of the data unit block is defined in the data volume (e.g., 16 KB). Each block of 64 KB in the cache memory 62 corresponds to each block of 16 KB in a data volume. Accordingly, when data of 64 KB is compressed, if this compressed data does not exceed 16 KB, this compressed data can be stored in the 16 KB block (basic block) associated with the relevant 64 KB block in the cache memory 62 in the data volume. However, if the compressed data exceeds 16 KB, an auxiliary block is required in addition to that 16 KB block. In other words, when the compressed data of 64 KB×1 data block consists of 16 KB×3 data blocks, the extra 2 data blocks will be stored in auxiliary blocks.

Suppose a write request for writing data D1 to a certain data volume is issued. In order to simplify the below explanation, the write data D1 is a single data block of a 64 KB block size. In order to store this write data D1 in the data volume under RAID control, it is necessary to obtain parity with data blocks D2 and D3 in the same parity group and to store them together (FIG. 10A).

The data blocks D1 to D3 are compressed under the control of the disk adapter 63 and compressed data blocks shown in FIG. 10B are obtained. The unit size of each compressed data block is 16 KB. The pre-compression data block D1 is converted to compressed data blocks D1-1 and D1-2, the pre-compression data block D2 is converted to compressed data blocks D2-1 and D2-2, and the pre-compression data block D3 is converted to compressed data block D3-1. Also, the parity data P for these pre-compression data blocks D1 to D3 is converted to compressed data blocks P-1 to P-4. In short, the compressed data blocks D1-2, D2-2 and P-2 to P-4 are data blocks that cannot be stored in basic blocks in the data volume.

In this embodiment, 64 KB blocks in the cache memory 62 are associated with 16 KB basic blocks in the data volume. The basic blocks are storage areas (actual storage areas) in actual volumes in the data volume. Since the entire compressed data of certain data cannot be stored in the actual storage areas, depending on the content of the original data, the non-storable data blocks are stored in blocks (extended storage areas) in a virtual volume.

As shown in FIG. 11, the compressed data blocks D1-1, D2-1, D3-1 and P-1 are stored respectively in actual volume blocks (actual storage areas) in pseudo disk devices (0) to (3) in the RAID group constituting that data volume. On the other hand, the compressed data blocks D1-2, D2-2 and P-2 to P-4 are stored respectively in virtual volume blocks (extended storage areas) in the corresponding pseudo disk devices (0) to (4) in this RAID group. However, as described above, the virtual volume is not assigned segments in the physical device that stores the actual relevant data. Accordingly, the actual data stored in the virtual volume is stored in the pool volume.

Figure 12:
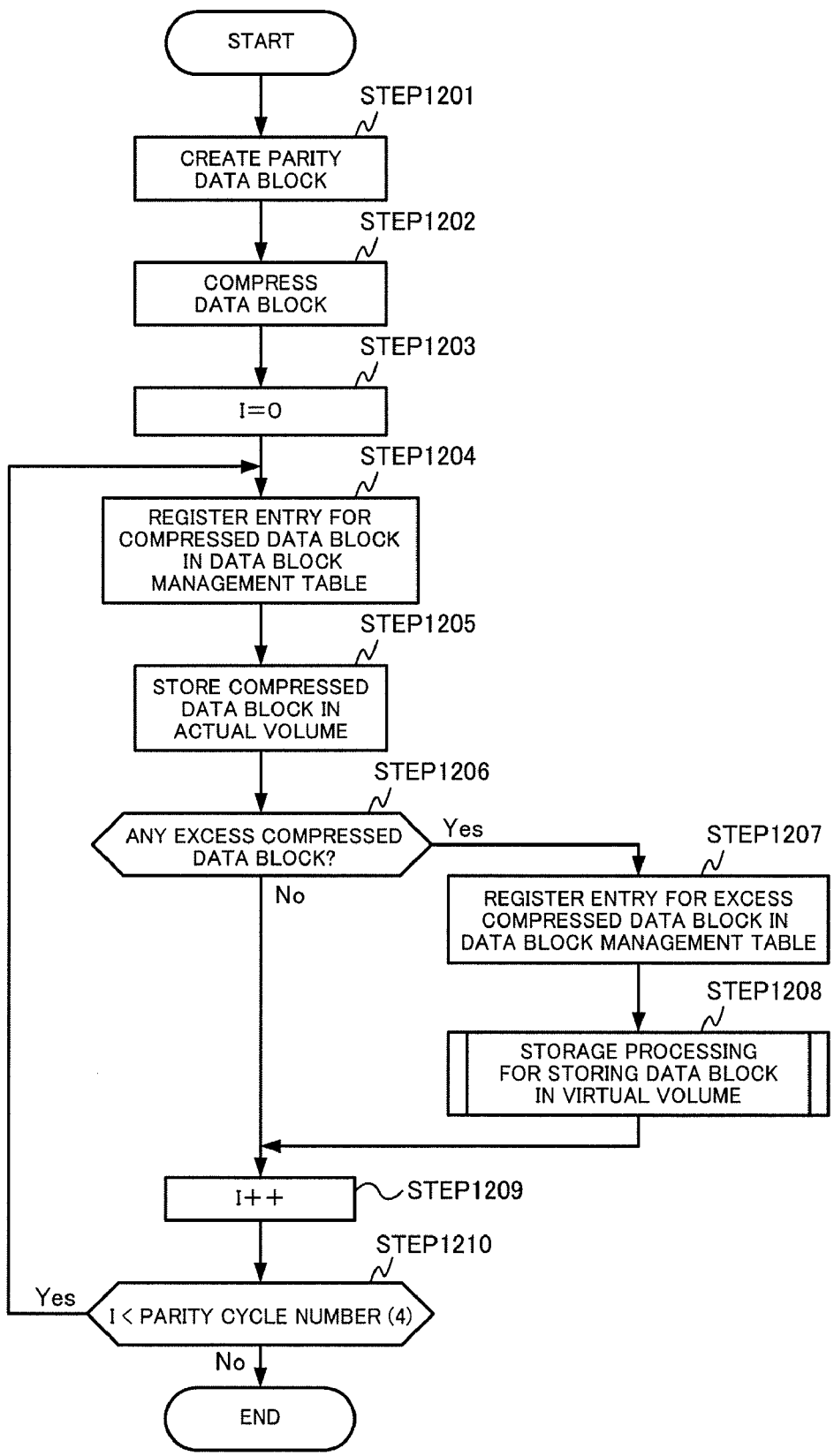
FIG. 12 is a flowchart explaining data write processing in the storage apparatus according to an embodiment of the present invention.

FIG. 12 is a flowchart explaining data write processing in the storage apparatus 4 according to the first embodiment of the present invention. Specifically, FIG. 12 explains the operation of the disk adapter 63 in the data write processing.

When referring to the shared memory 64 and finding an unprocessed write command there, the disk adapter 63 identifies the corresponding write data in the cache memory 62. The disk adapter 63 creates parity data according to the RAID configuration based on this write data (step 1201). In other words, in this example, the disk adapter 63 creates one parity data block for every three data blocks in accordance with RAID 5 (3D+1P) configuration. These three data blocks and one parity data block form one parity group. Accordingly, even when one of the data blocks is written, a new parity data block needs to be created together with the remaining two data blocks in the same parity group. This is referred to as "write penalty" in general. In this phase, each data block has a 64 KB block size.

Next, the disk adapter 63 performs compression processing on each data block (including the parity data block) in the relevant parity group to create a compressed data string for each data block (step 1202). The compressed data string includes one or more data blocks (compressed data blocks). The disk adapter 63 writes the compressed data blocks in the blocks for compressed data in the cache memory and updates the cache management table. The block for compressed data has a block size, for example, of 16 KB.

The disk adapter 63 then performs the processing below in order to distribute and store the compressed data blocks in pseudo disk devices of different systems.

Specifically, disk adapter 63 sets a parity cycle variable I to 0 (step 1203). The disk adapter 63 then registers an entry for the relevant compressed data block in the data block management table (step 1204). In other words, the disk adapter 63 assigns the top compressed data block in the compressed data string that should be stored in a pseudo disk device (I) with the address of the actual storage area in the pseudo disk device (I). Specifically, if the compressed data string consists of compressed data blocks D1-1 and D1-2, the address of the actual storage area in the pseudo disk device (I) is first assigned to the compressed data block D1-1. Then the disk adapter 63 stores the relevant compressed data block in this actual storage area based on the assigned address (step 1205).

Next, the disk adapter 63 judges whether or not the compressed data string includes an excess data block (step 1206), i.e., whether the compressed data string includes two or more compressed data blocks. If it is determined that there is no excess compressed data block (step 1206: No), the disk adapter 63 increments the parity cycle variable I (step 1209) and then judges whether or not the parity cycle variable I is smaller than a predetermined parity cycle number (which is 4 in this example) (step 1210). If the parity variable I is smaller than the predetermined parity cycle number (step 1210: Yes), that means there is an unprocessed compressed data block in the relevant parity group, so the processing returns to step 1204.

If it is determined that there is an excess compressed data block (step 1206: Yes), the disk adapter 63 registers the entry of this excess compressed data block in the data block management table (step 1207). In other words, the disk adapter 63 assigns the excess compressed data block an extended storage area in the pseudo disk device (I).

The disk adapter 63 next performs processing for storing the excess compressed data block in the virtual volume (step 1208). The storage processing for the virtual volume will be described later in detail.

The disk adapter 63 then increments the parity cycle variable I (step 1209) and judges whether or not the parity cycle variable I is smaller than the predetermined parity cycle number (which is 4 in this example) (step 1210). If the parity cycle is smaller than the predetermined parity cycle number (step 1210: Yes), there is an uncompressed data block in the parity group, so the processing returns to step 1204.

When the parity cycle variable I reaches the predetermined parity cycle number (step 1210: No), the disk adapter 63 terminates the data write processing.

Figure 13:
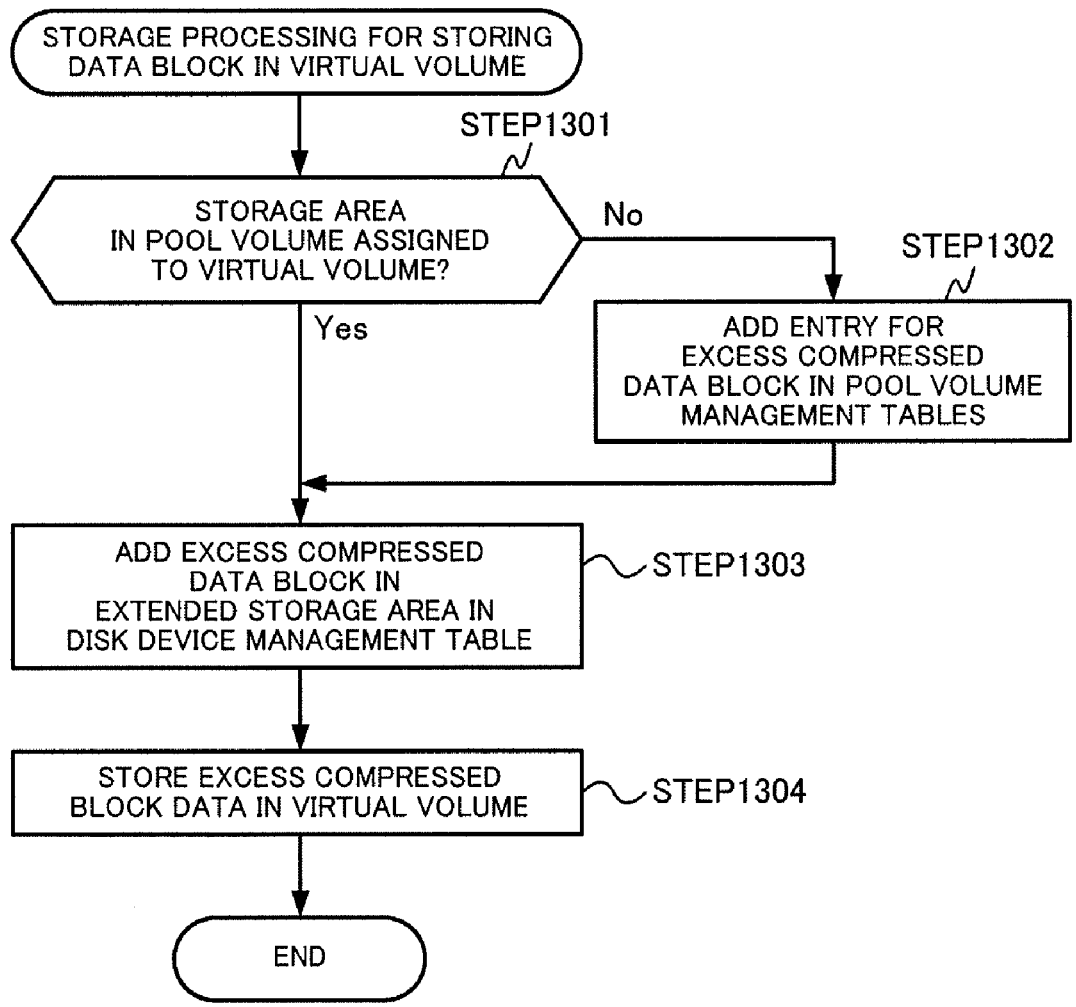
FIG. 13 is a flowchart explaining data write processing for a virtual volume in the storage apparatus according to an embodiment of the present invention.

FIG. 13 is a flowchart explaining data write processing for a virtual volume in the storage apparatus 4 in the first embodiment of the present invention. Specifically, FIG. 13 is a flowchart explaining in detail step 1208 shown in FIG. 12.

As shown in FIG. 13, the disk adapter 63 first judges whether or not a storage area in the pool volume has been assigned to the virtual volume (step 1301). If it is determined that the storage area in the pool volume has not been assigned to the virtual volume (step 1301: No), the disk adapter adds an entry for the excess compressed data block in the pool volume management table (step 1302). In the above example, the address in the virtual volume and the address in the pool volume, regarding the compressed data block D1-2, are associated with each other.

Subsequently, the disk adapter 63 adds the excess compressed data block in the extended storage area in the disk device management table (step 1303). The disk adapter 63 then stores the excess compressed data in the virtual volume (step 1304). At this time, the excess compressed data is actually stored in the disk device 5 providing the pool volume under the control of the disk adapter 63.

As described above, according to this embodiment, in the storage apparatus 4 in which write data is compressed before being stored and therefore blocks in the cache memory 62 are fixedly assigned to smaller blocks in the disk device 5, even if the entire compressed data cannot be stored in the blocks in the disk device 5, the non-storable portion of this compressed data can be stored in an extended storage area. Since this extended storage area is managed as the pool volume associated with the extended storage area, a configuration of disk devices suitable for the actual use of the storage areas can be flexibly employed.

Second Embodiment

The second embodiment will describe a storage apparatus 4 that is adapted to mirror the compressed data of write data and then store the mirrored compressed data in the RAID 1 configuration and to store the copied compressed data in a virtual volume.

Figure 14:
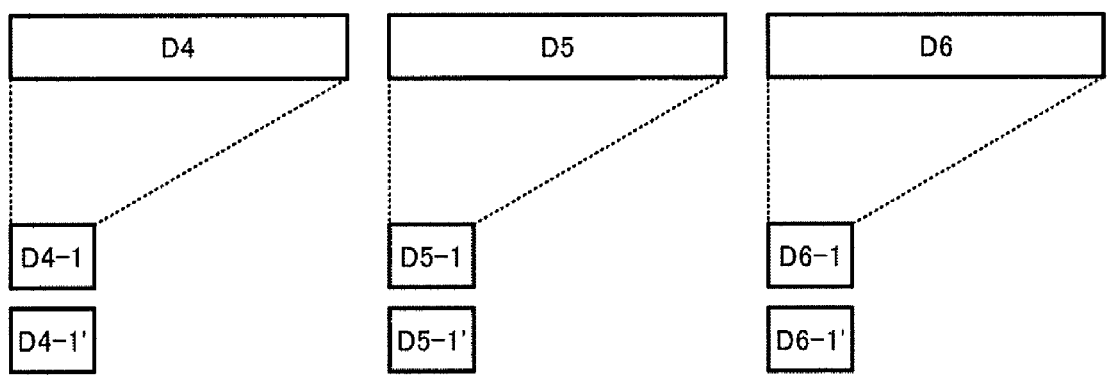
FIG. 14 is a diagram explaining a data write mechanism in a storage apparatus according to an embodiment of the present invention.
Figure 15:
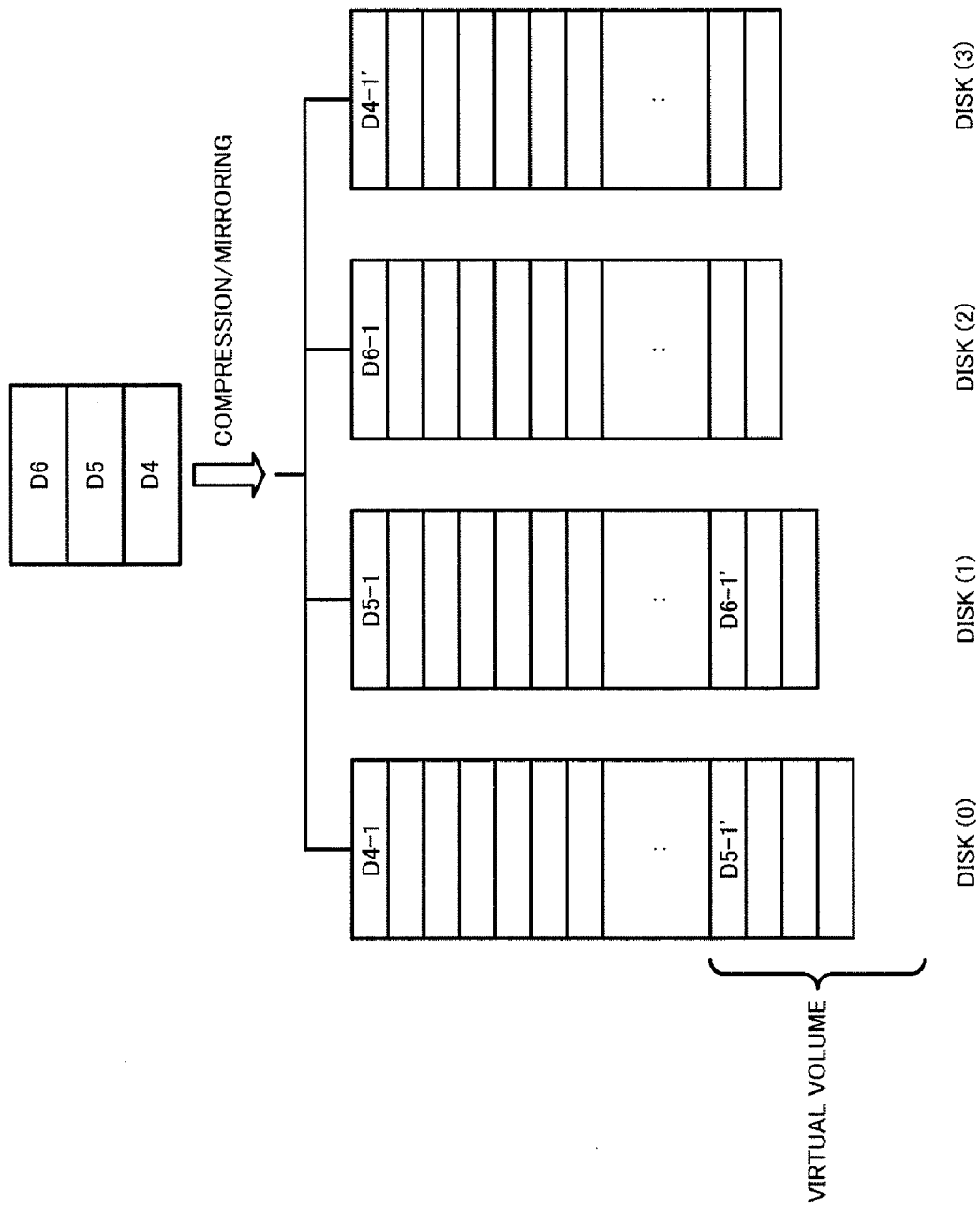
FIG. 15 is a diagram explaining the data write mechanism in the storage apparatus according to an embodiment of the present invention.

FIGS. 14 and 15 are diagrams explaining the data write mechanism in the storage apparatus 4 according to the second embodiment of the present invention. Specifically, these figures explain how write data D4 to D6 is written, after being compressed, in pseudo disk devices under the RAID 1 (4D) configuration.

Suppose write data D4 to D6 will be stored in a certain data volume. In order to simplify the below explanation, each write data D4 to D6 is a single data block having a block size of 64 KB. The data blocks D4 to D6 are compressed under the control of the disk adapter 63 and compressed data blocks D4-1 to D6-1 are obtained. The copied data (mirrored data) of each of the compressed data blocks D4-1 to D6-1 is indicated as compressed data bocks D4-1' to D6-1'. The compressed data block size is 16 KB. Accordingly, the storage apparatus 4 stores 16 KB×6 data blocks for 64 KB×3 data blocks (FIG. 14).

In this embodiment, as shown in FIG. 15, these compressed data blocks are distributed and stored in actual storage areas in pseudo disk devices, and in addition, the mirrored compressed data blocks are distributed and stored in extended storage areas. However, as in this example, if there are four pseudo disk devices for the three-data cycle, one of the mirrored compressed data blocks may be stored in an actual storage area in the fourth pseudo disk device.

FIG. 16 shows an example of a data block management table stored in the shared memory 64 in the storage apparatus 4 according to the second embodiment of the present invention. As shown in FIG. 16, the data block management table in this embodiment associates a first address and a second address with each other for each slot ID. The second address is the address of a data volume in which a mirrored compressed data block is stored.

Figure 17:
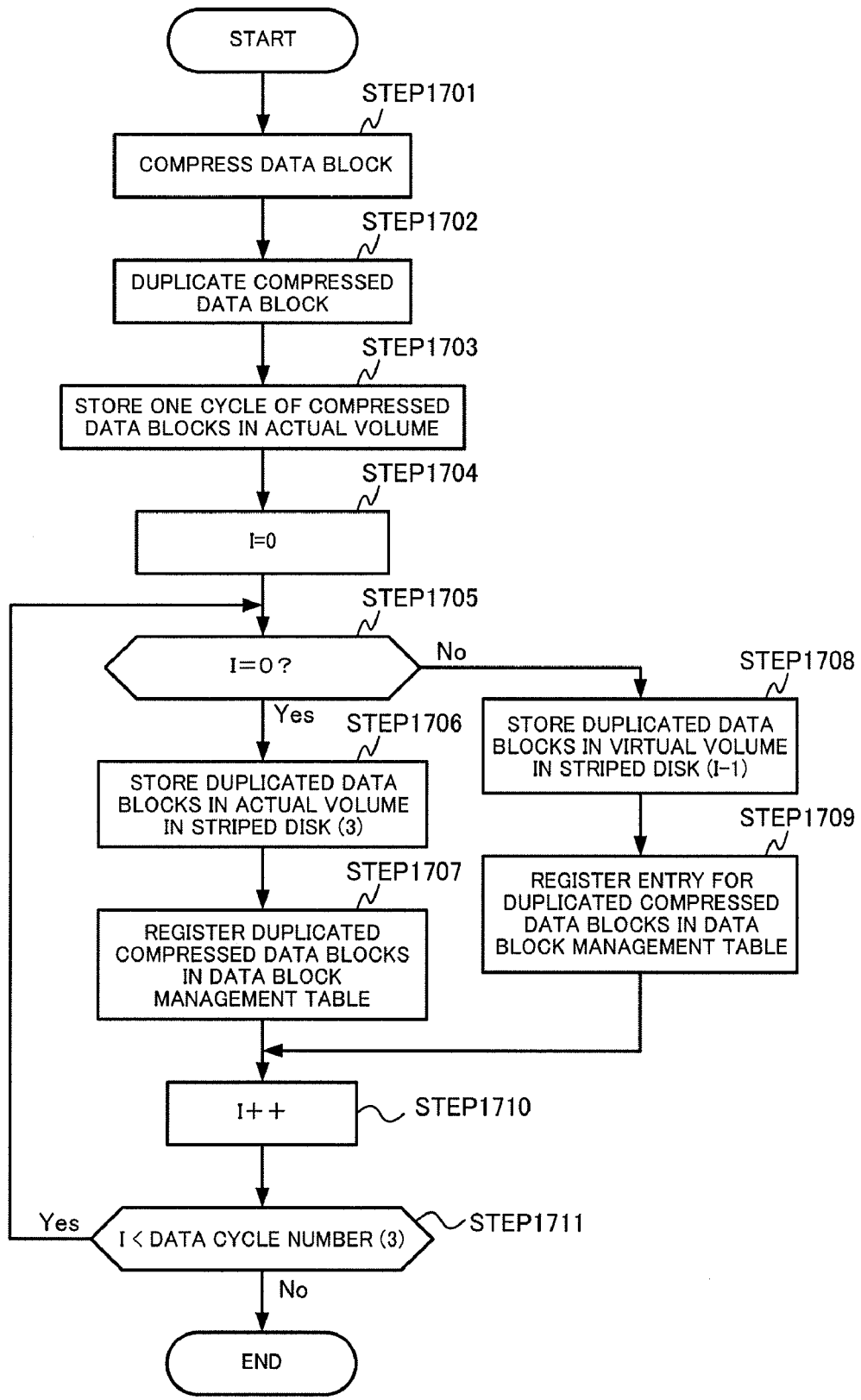
FIG. 17 is a flowchart explaining data write processing in the storage apparatus according to an embodiment of the present invention.

FIG. 17 is a flowchart explaining data write processing in the storage apparatus 4 according to the second embodiment of the present invention. Specifically, FIG. 17 explains the operation of the disk adapter 63 in the data write processing. It should be noted that the RAID group in this embodiment is 4D.

Specifically, as shown in FIG. 17, when referring to the shared memory 64 and finding an unprocessed write command, the disk adapter identifies the corresponding write data in the cache memory 62. The disk adapter 63 performs compression processing for data blocks included in this write data to create compressed data blocks (step 1701), and copies these compressed data blocks (step 1702). The compressed data blocks and their copied compressed data blocks are stored in blocks for compressed data in the cache memory 62.

In this example, three compressed data blocks define one data cycle and the copied data blocks are stored subsequently.

The disk adapter 63 then performs the below processing in order to distribute and store the compressed data blocks in the pseudo disk devices of different systems. First, the disk adapter 63 distributes and stores one data cycle of compressed data blocks in the pseudo disk devices (0) to (2) of different systems (step 1703). The disk adapter 63 then sets the data cycle variable I to 0 (step 1704).

The disk adapter 63 judges whether or not the data cycle variable I is 0 (step 1705). In other words, the disk adapter 63 selects the copied compressed data block (e.g., D4-1') corresponding to the compressed data block stored in the pseudo disk device (0) (e.g., D4-1).

When it is determined that the data cycle variable I is 0 (step 1705: Yes), the disk adapter 63 stores the relevant copied compressed data block in an actual storage area in the pseudo disk device (3) (step 1706), and registers an entry for the relevant copied compressed data block in the data block management table (step 1707).

In contrast, if it is determined that the data cycle variable I is not 0, the disk adapter 63 stores the relevant copied compressed data block in an extended storage area in the pseudo disk device (I-1) (step 1708) and registers an entry for the relevant copied compressed data block in the data block management table (step 1709). In other words, the copied compressed data blocks corresponding to the compressed data blocks stored in the pseudo disk devices other than the pseudo disk device (0) are shifted by one pseudo disk device in the cycle and stored.

The disk adapter 63 then increments the data cycle variable I (step 1710) and judges whether or not the data cycle variable I reaches one data cycle (step 1711). If it is determined that the data cycle variable I does not reach one data cycle (step 1711: No), the disk adapter 63 returns to step 1705. On the other hand, if it is determined the data cycle variable I reaches one data cycle (step 1711: Yes), the disk adapter 63 terminates the write processing.

As described above, when the compressed data of write data is stored after mirroring the compressed data in RAID 1 configuration, the copied compressed data is stored in the virtual volume, thereby realizing efficient data storage.

Third Embodiment

The third embodiment is a combination of the technical feature in the above first embodiment and the technical feature in the above second embodiment. Specifically, in this embodiment, the storage apparatus 4 creates parity data blocks for each parity group when performing data write processing and performs compression processing for each data block. The storage apparatus 4 then judges which data storage procedure—the data storage procedure using parities or the data storage procedure using mirroring—is more efficient based on the compression processing result, and stores the compressed data blocks in the data volume in accordance with the data storage method that has been determined to be more efficient. At this time, the compressed data blocks are suitably stored in the virtual volumes as described above.

Figure 19:
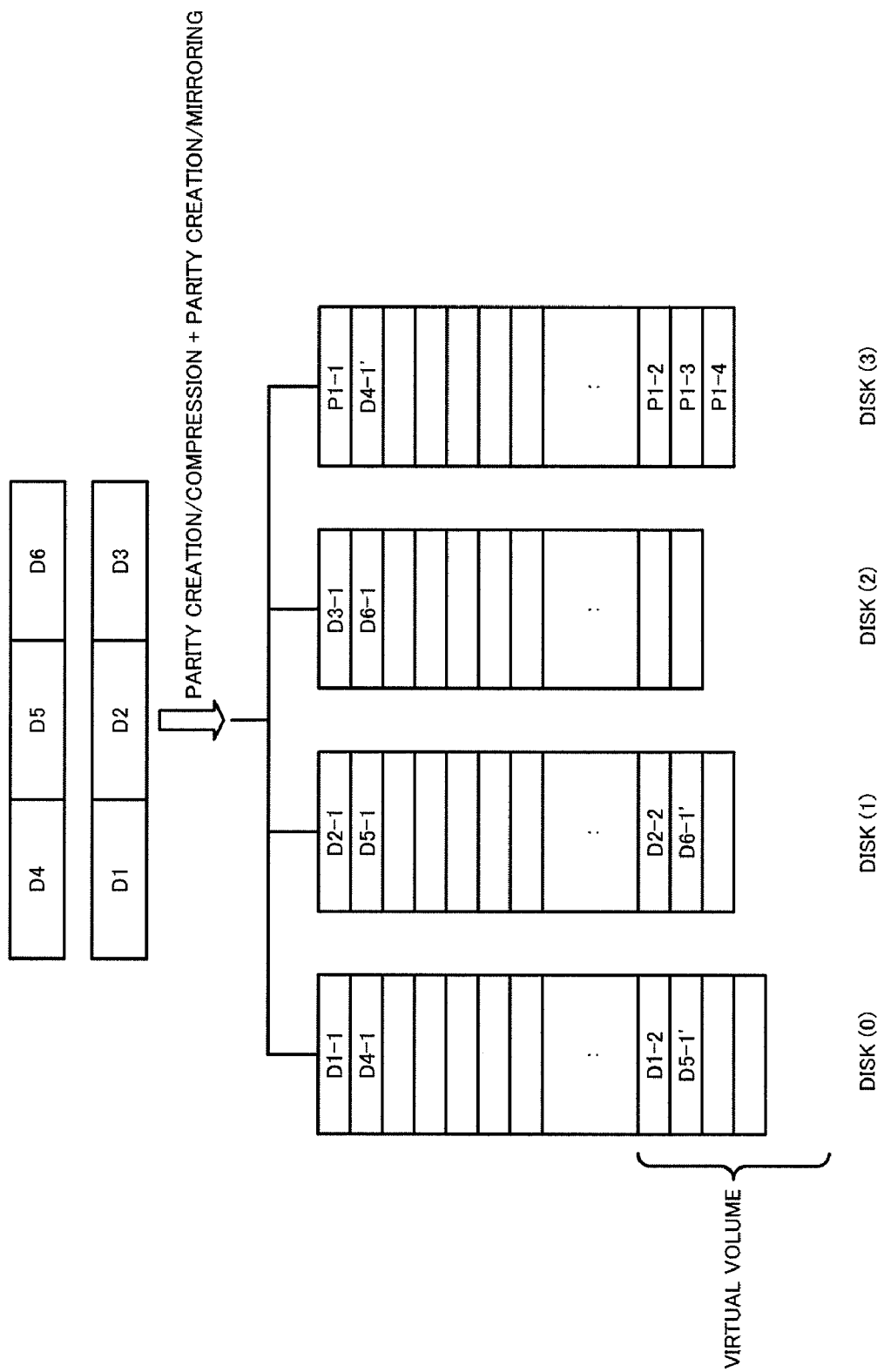
FIG. 19 is a diagram explaining the data write mechanism in the storage apparatus according to an embodiment of the present invention.

FIGS. 18A and 18B and FIG. 19 are diagrams explaining a data write mechanism in the storage apparatus 4 according to the third embodiment of the present invention. Specifically, these figures each show how compressed write data is stored in pseudo disk devices in RAID 5 (3D+1P) configuration or RAID 1 (4D) configuration.

Suppose a write request for writing data D1 to a certain data volume is issued and subsequently a write request for writing data D5 to the certain data volume is issued. In order to simplify the below explanation, the write data is a single data block having a data block size of 64 KB. In order to store the write data (data blocks) in the data volume under the RAID 5 control, it is necessary to obtain a parity together with data blocks in the same parity group and store them in the volume. Specifically, a parity data block P1 is obtained together with data blocks D2 and D3 for the data block D1 and a parity data block P2 is calculated together with data blocks D4 and D6 for the data block D5. These data blocks and parity blocks are data blocks that are uncompressed and stored in the 64 KB blocks in the cache memory 62.

Suppose the data blocks D1 to D3 and P3 are compressed by the disk adapter 63 and compressed data blocks as shown in FIG. 18A are obtained. These data blocks are compressed data blocks stored in the 16 KB blocks in the cache memory 62. As described earlier, the compressed data blocks D1-2, D2-2 and P1-2 to P1-4 are data blocks that cannot be stored in the actual storage areas in the actual volume.

In contrast, suppose compressed data blocks shown in FIG. 18B are obtained from the data blocks D4 to D6 and P2 compressed by the disk adapter 63. In other words, the data blocks D4 to D6 are converted to the data blocks D4-1 to D6-1 that can be stored in one of the actual storage areas in the actual volume in the data volume. The data block P2 has low compression efficiency (i.e., high compression ratio) and is converted to compressed data blocks P2-1 to P2-4. It should be noted that the compression ratio in this specification is a value obtained by dividing the size of compressed data by the size of the data before being compressed. Thus, low compression ratio means that the size of the data after compression is small, and therefore means high compression efficiency.

As described above, seven compressed data blocks are created from the data blocks D4 to D6 and P2. If the data blocks D4-1 to D6-1 are doubled and stored in the data volume, only six compressed data should be stored. Accordingly, the storage apparatus 4 in this embodiment checks, after compressing the write data, the number of compressed data blocks including the parity blocks and selects the procedure that requires the storage of a smaller number of compressed data blocks.

Accordingly, as shown in FIG. 19, the compressed data blocks D1-1, D2-1, D3-1 and P-1 are stored respectively in the actual volume of the pseudo disk devices (0) to (3) in the RAID group constituting the data volume. The compressed data blocks D1-2, D2-2 and P-2 to P-4 are stored respectively in the virtual volume of the corresponding pseudo disk devices (0) to (4) in that RAID group.

The compressed data blocks D4-1 to D6-1 are mirrored under the control of RAID 1 and stored in the pseudo disk devices (0) to (3) using the extended storage areas.

FIG. 20 shows an example of a data block management table stored in the shared memory 64 in the storage apparatus 4 according to the third embodiment of the present invention. Specifically, FIG. 20 shows the data block management table when write data is stored by the data storage procedure using the parity in accordance with the example described above. The data block management table that is obtained from when write data is stored in the data storage procedure using the mirroring is the same as that shown in FIG. 16.

Figure 21:
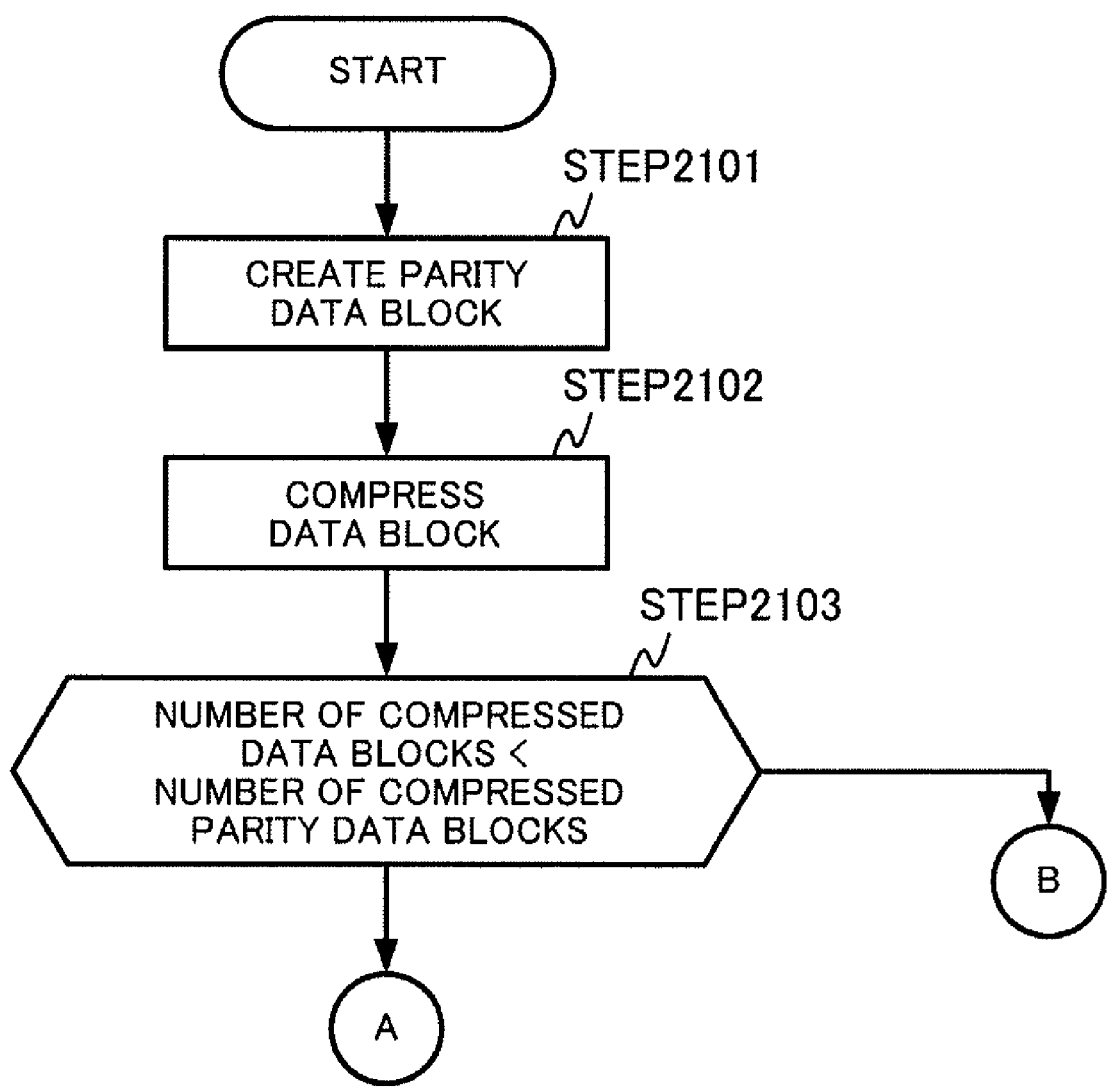
FIG. 21 is a flowchart explaining data write processing in the storage apparatus according to an embodiment of the present invention.
Figure 22:
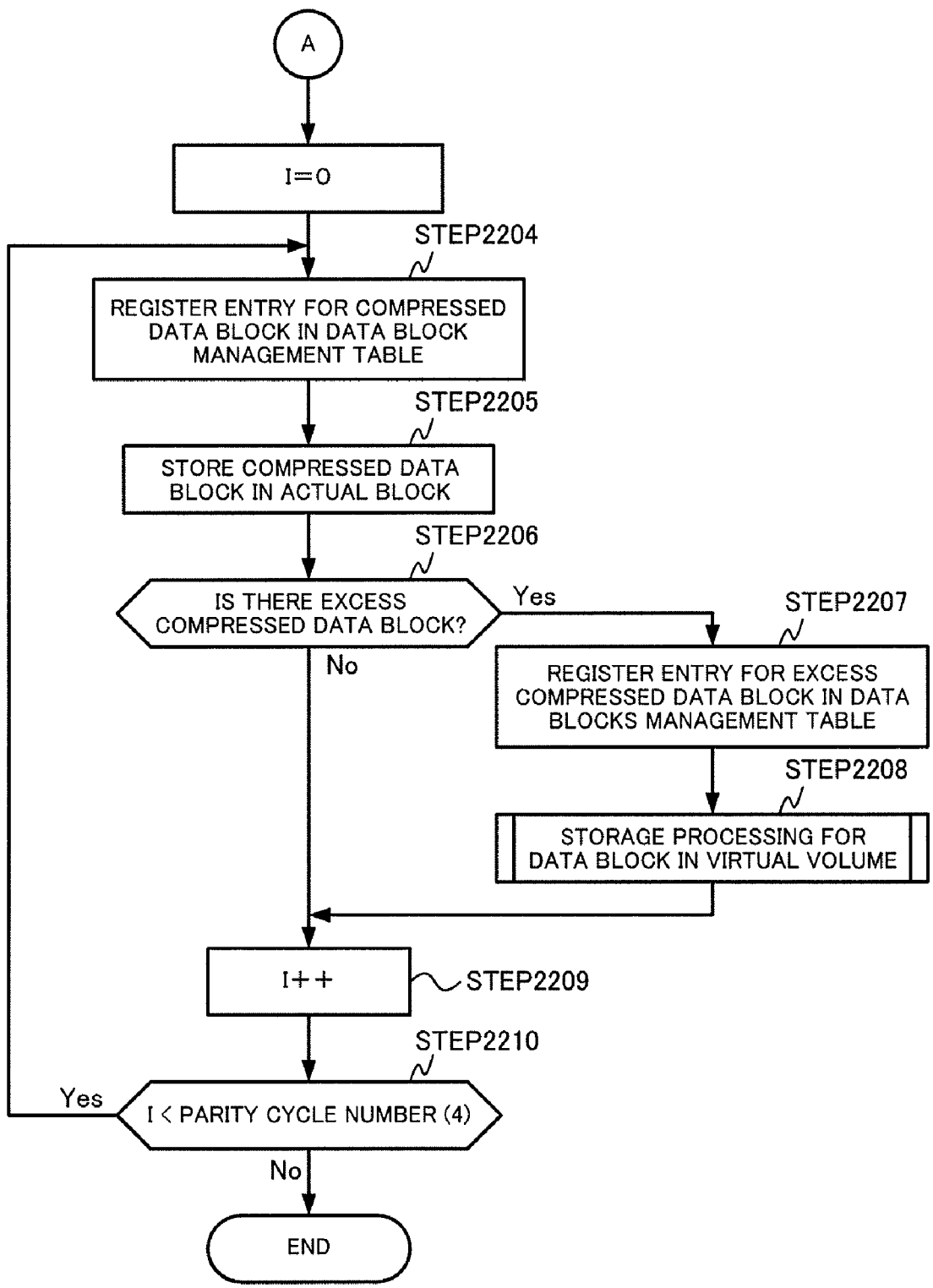
FIG. 22 is a flowchart explaining the data write processing in the storage apparatus according to an embodiment of the present invention.
Figure 23:
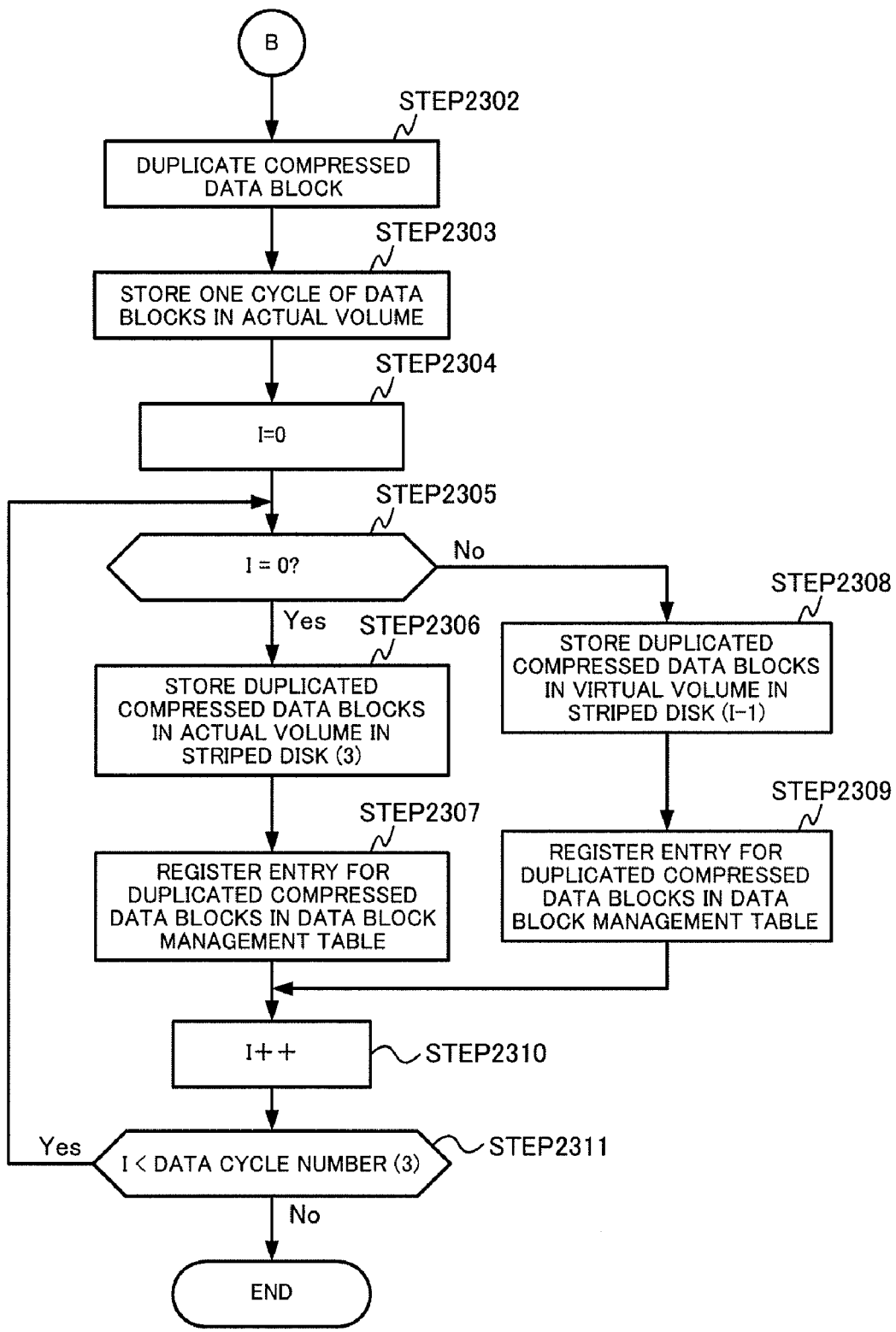
FIG. 23 is a flowchart explaining the data write processing in the storage apparatus according to an embodiment of the present invention.

FIGS. 21 to 23 are flowcharts explaining data write processing in the storage apparatus 4 according to the third embodiment of the present invention. Specifically, FIGS. 21 to 23 each show the operation of the disk adapter 63 in the data write processing.

When referring to the shared memory 64 and finding an unprocessed write command, the disk adapter 63 identifies the corresponding write data in the cache memory 62. The disk adapter 63 creates parity data according to the RAID configuration based on the write data (step 2101). In other words, in this example, the disk adapter 63 creates a parity group consisting of three data blocks and one parity data block in accordance with the RAID 5 (3D+1P) configuration. In this phase, the size of each data block is 64 KB.

The disk adapter 63 next compresses each data block in the created parity group to create a compressed data string for each data block (step 1202). The disk adapter 63 then writes the compressed data blocks included in each compressed data string in the blocks for compressed data in the cache memory 62, and updates the cache management table. Each of the blocks for compressed data has a 16 KB block size.

The disk adapter 63 then judges whether or not the number of the compressed data blocks (excluding the compressed parity data blocks) in the parity group is smaller than the number of the compressed parity data blocks (step 2103). In other words, the disk adapter 63 judges which data storage procedure—the procedure using parity or the procedure using mirroring—should be used in order to store the write data more efficiently.

If it is determined that the number of compressed data blocks is smaller than the number of compressed parity data blocks in the parity group, the disk adapter 63 performs the processing shown in FIG. 22. Since the processing shown in FIG. 22 is the data storage processing using parity and is the same as the processing from step 1203 onwards in FIG. 12, its explanation will be omitted.

In contrast, if it is determined that the number of compressed data blocks is larger than the number of parity data block blocks in the parity group, the disk adapter 63 performs the processing shown in FIG. 23. Since the processing shown in FIG. 23 is data storage processing using mirroring and is the same as the processing from step 1702 onwards in FIG. 17, its explanation will be omitted.

As described above, according to this embodiment, when write data is compressed and stored, the optimum RAID configuration is selected based on the size of the compressed data including the parity data and the size of the compressed data that has been doubled without using the parity data, and therefore the compressed data can be efficiently stored.

Fourth Embodiment

The fourth embodiment is a modification from the third embodiment and has a feature in which a data storage procedure for a write command directed to certain data is stored and utilized when another write command for this data is issued.

FIGS. 24A and 24B are diagrams each showing an example of a data block management table stored in the shared memory 64 in the storage apparatus 4 according to the fourth embodiment of the present invention. As shown in these figures, the data block management table in this embodiment is similar to the data block management tables described above, but is only different in that it contains remembered information that stores the data storage procedure used last time. Specifically, FIG. 24A shows the state in which the data block management table contains remembered information "RAID 5," while FIG. 24B shows the state in which the data block management table contains no remembered information.

Figure 25:
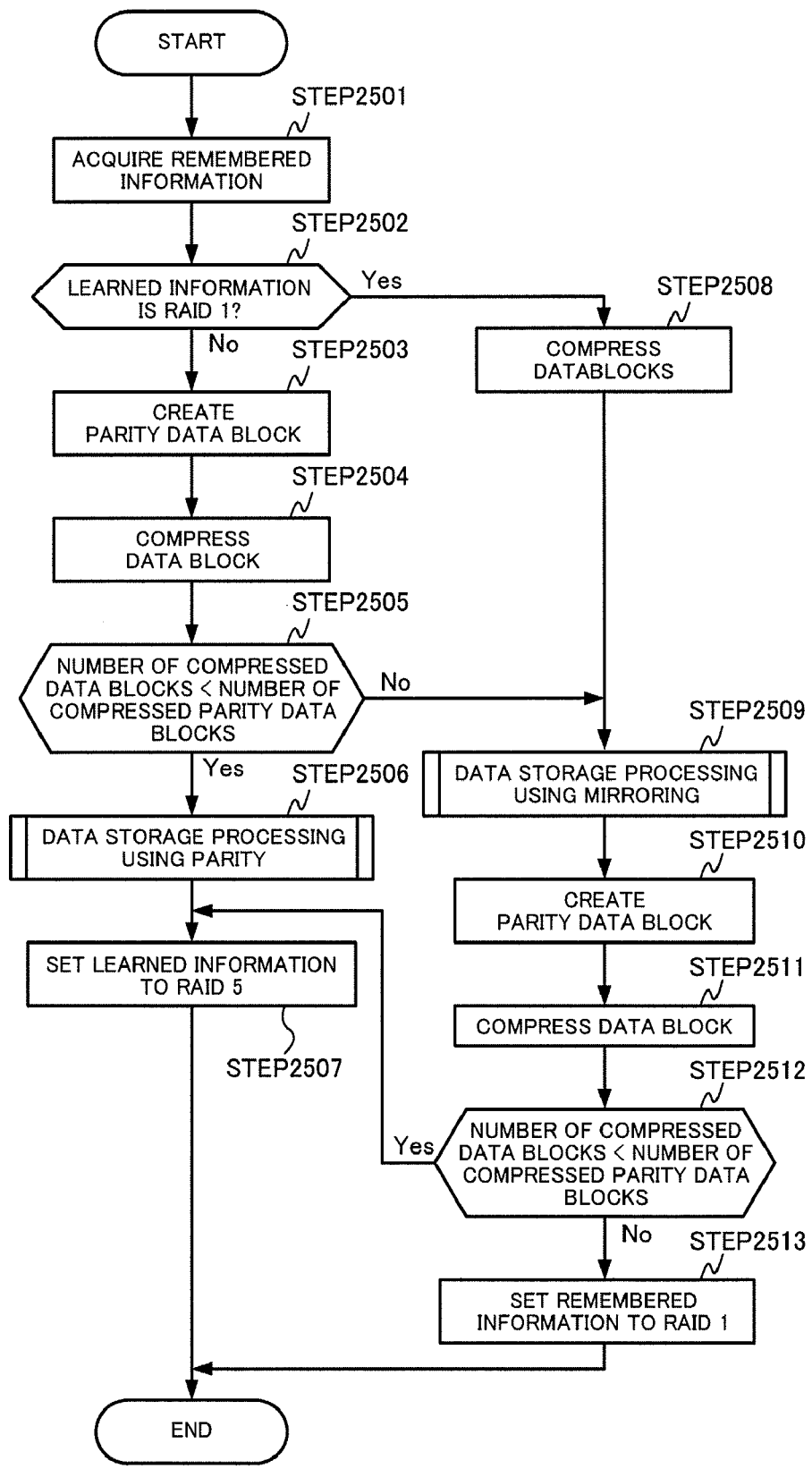
FIG. 25 is a flowchart explaining data write processing in the storage apparatus according to an embodiment of the present invention.

FIG. 25 is a flowchart explaining data write processing in the storage apparatus 4 according to the fourth embodiment of the present invention.

As described in FIG. 25, when referring to the shared memory 64 and finding an unprocessed write command, the disk adapter 63 identifies the corresponding write data in the cache memory 62. The disk adapter 63 then refers to the data block management table for this write data, acquires the current remembered information (step 2501) and judges whether or not the current information is "RAID 1" (step 2502).

If it is determined that the current remembered information is not "RAID 1" (step 2502: No), the disk adapter 63 performs compressed data storage processing under the RAID 5 control.

Specifically, as described earlier, the disk adapter 63 creates a parity data block according to the RAID configuration (step 2503) and then compresses each data block in the parity group (step 2504).

The disk adapter 63 then judges whether or not the number of compressed data blocks (excluding compressed parity data blocks) in the parity group is smaller than the number of the compressed parity data blocks (step 2505). In other words, the disk adapter 63 judges which storage procedure—the procedure using parity or the procedure using mirroring—should be selected in order to store the write data more efficiently.

When it is determined that the number of compressed data blocks in the parity group is greater than the number of the compressed parity data blocks, the disk adapter 63 performs the data storage processing using mirroring (step 2509). The data storage processing using mirroring is the same as the processing shown in FIG. 23.

In contrast, if it is determined that the number of the compressed data blocks in the parity group is smaller than the number of the compressed parity data blocks, the disk adapter 63 performs that data storage processing using parity (step 2506). The data storage processing using parity is the same as the processing shown in FIG. 22.

Then the disk adapter 63 sets "RAID 5" in the remembered information in the data block management table for the data write processing to be performed next (step 2507).

If it is determined that the current remembered information is "RAID 1" in step 2502 (step 2502: Yes), the compressed data storage processing is performed under RAID 1 control.

Specifically, the disk adapter 63 first compresses the data blocks (step 2508) and then performs data storage processing using the mirroring (step 2509).

After completing the data storage processing using the mirroring, the disk adapter 63 creates the parity data blocks according to the RAID configuration in order to judge whether or not the remembered information should be updated (step 2510), and then compresses the data blocks in the parity group (step 2511). The disk adapter 63 judges whether or not the number of compressed data blocks (excluding compressed parity data blocks) in the parity group is smaller than the number of the compressed parity data blocks (step 2512).

When it is determined that the number of compressed data blocks in the parity group is smaller than the number of compressed parity data blocks (step 2512: Yes), the disk adapter 63 sets "RAID 5" in the remembered information in the data block management table (step 2507).

In contrast, if it is determined that the number of the compressed data blocks in the parity group is grater than the number of compressed parity data blocks (step 2512: No), the disk adapter 63 sets "RAID 1" in the remembered information in the data block management table (step 2513).

As described above, according to this embodiment, since the data storage procedure used last time is stored, the RAID configuration can be selected even more efficiently.

The above embodiments are examples presented for explaining the present invention, and the present invention is not limited to these embodiments. The present invention can be embodied in various ways without departing from the spirit of the invention.

For example, in the above embodiments, the operations of the disk adapter are sequentially arranged in the flowcharts, but that operation sequence may be rearranged or some operations may be performed in parallel as long as that change does not cause a different operation result.

Although RAID 5 is employed in the above embodiments, other known RAID configurations using parity, such as RAID 3, RAID 4 and RAID 6 may also be used.

The present invention can be widely applied in storage apparatuses that employ RAID configurations.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A storage apparatus comprising:
   a disk device having a storage medium for storing data in accordance with commands from a host computer; and
   a disk adapter that is connected to the disk device, the disk adapter configured to control the disk device,
      wherein the disk adapter controls the disk device to form a data volume and a pool volume, the data volume including an actual volume that is defined with a storage capacity larger than an inherent storage capacity for the storage medium and is associated with a storage area in the storage medium, and a virtual volume that is assigned a storage area other than the actual volume, the pool volume being assigned with a storage area for storing data to be stored in the storage area assigned to the virtual volume;
      wherein the disk adapter creates data block for parity data, based on write data according to a write command transmitted from the host computer, the parity data in a parity group to which the write data belongs under control based on a predetermined RAID configuration having a data block that constitutes the write data and another data block in the parity group, and compresses the write data and the created parity data in the parity group to create compressed data blocks and compressed parity data blocks;
      wherein the disk adapter judges whether the number of compressed data blocks excluding compressed parity data blocks is smaller than the number of the compressed parity data blocks; and
      wherein the disk adapter judges whether the size of the compressed data and the size of the compressed parity data in the parity group are each within a predetermined size, depending on whether a compressed data string obtained by compressing each of the data blocks in the parity group includes compressed data blocks of a number exceeding a predetermined number; and if the number of the compressed data blocks excluding the compressed parity data blocks is determined to be smaller than the number of the compressed parity data blocks, stores a number of compressed data blocks equal to or less than the predetermined number and compressed parity data that are within the predetermined size in storage areas in the actual volume, and stores remaining compressed data blocks of a number greater than the predetermined number and compressed parity data that exceed the predetermined size in storage areas in the pool volume corresponding to the virtual volume.

2. The storage apparatus according to claim 1, wherein the disk adapter distributes and stores the compressed data blocks in the parity groups in disk devices that are of physically different systems and provides the data volume.

3. The storage apparatus according to claim 2, wherein the disk adapter stores the compressed data blocks constituting the compressed data string in an actual volume and a virtual volume formed in a disk device that are of common system and provides the data volume.

4. The storage apparatus according to claim 1, wherein the size of storage areas for storing each data block in the parity group is larger than the size of a unit storage area in the actual volume.

5. The storage apparatus according to claim 1, wherein, if the number of the compressed data blocks excluding the compressed parity data blocks is determined to be greater than the number of compressed parity data blocks, the disk adapter duplicates the compressed data blocks excluding the compressed parity data blocks, and stores the duplicated compressed data blocks respectively in the disk devices that are of the physically different systems and constitutes the data volume.

6. The storage apparatus according to claim 5, wherein the disk adapter stores, in the duplicated compressed data blocks in the parity group, one in the actual volume in the data volume and stores the other in the virtual volume in the data volume.

7. The storage apparatus according to claim 1, wherein the disk adapter stores a data storage procedure according to a RAID configuration for write data relating to the write request, compresses the write data based on the stored data storage procedure and stores the compressed data in the data volume.

8. A data storage method for a data storage apparatus comprising a disk device having a storage medium for storing data and a disk adapter configured to control the disk device in accordance with commands from a host computer, the method comprising:
   controlling the disk device to form a data volume and a pool volume, the data volume including an actual volume that is defined with a storage capacity larger than an inherent storage capacity for the storage medium and is associated with a storage area in the storage medium, and a virtual volume that is assigned a storage area other than the actual volume, the pool volume being assigned a storage area for storing data to be stored in the storage area assigned to the virtual volume;
   creating a data block for parity data, based on write data relating to a write command transmitted from the host computer, the parity data in a parity group to which the write data belongs based on a predetermined RAID configuration having a data block that constitutes the write data and another data block in the parity group;
   compressing the write data and the created parity data in the parity group to create compressed data blocks and compressed parity data blocks; judging whether the number of compressed data blocks excluding compressed parity data blocks is smaller than the number of the compressed parity data blocks;
   judging whether the size of the compressed data and the size of the compressed parity data in the parity group are each within a predetermined size, depending on whether a compressed data string obtained by compressing each of the data blocks in the parity group includes compressed data blocks of a number exceeding a predetermined number; and if the number of the compressed data blocks excluding the compressed parity data blocks is determined to be smaller than the number of the compressed parity data blocks, storing a number of compressed data blocks equal to or less than the predetermined number and compressed parity data that are within the predetermined size in storage areas in the actual volume, and storing the remaining compressed data blocks of a number greater than the predetermined number and compressed parity data that exceed the predetermined size in storage areas in the pool volume corresponding to the virtual volume.

9. The method according to claim 8, wherein the disk adapter distributes and stores the compressed data blocks in the parity groups in disk devices that are of physically different systems and provides the data volume.

10. The method according to claim 8, wherein the disk adapter stores the compressed data blocks constituting the compressed data string in an actual volume and a virtual volume formed in a disk device that are of common system and provides the data volume.

11. The method according to claim 8, wherein the size of storage areas for storing each data block in the parity group is larger than the size of a unit storage area in the actual volume.

12. The method according to claim 8, wherein, if the number of the compressed data blocks excluding the compressed parity data blocks is determined to be greater than the number of compressed parity data blocks, the disk adapter duplicates the compressed data blocks excluding the compressed parity data blocks, and stores the duplicated compressed data blocks respectively in the disk devices that are of the physically different systems and constitutes the data volume.

13. The method according to claim 12, wherein the disk adapter stores, in the duplicated compressed data blocks in the parity group, one in the actual volume in the data volume and stores the other in the virtual volume in the data volume.

14. The method according to claim 8, wherein the disk adapter stores a data storage procedure according to a RAID configuration for write data relating to the write request, compresses the write data based on the stored data storage procedure and stores the compressed data in the data volume.

* * * * *